United States Patent
Kim et al.

(10) Patent No.: US 9,524,638 B2
(45) Date of Patent: Dec. 20, 2016

(54) CONTROLLING MOBILE DEVICE BASED ON SOUND IDENTIFICATION

(71) Applicant: Qualcomm Incorporated, San Diego, CA (US)

(72) Inventors: Taesu Kim, Seoul (KR); Kyu Woong Hwang, Taejon (KR); Minho Jin, Gyeonggi-do (KR)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 13/752,080

(22) Filed: Jan. 28, 2013

(65) Prior Publication Data

US 2013/0201800 A1 Aug. 8, 2013

Related U.S. Application Data

(60) Provisional application No. 61/596,576, filed on Feb. 8, 2012.

(51) Int. Cl.
*G10K 11/00* (2006.01)
*G08C 23/02* (2006.01)
(Continued)

(52) U.S. Cl.
CPC .............. *G08C 23/02* (2013.01); *G06F 3/167* (2013.01); *H04M 1/271* (2013.01); *H04M 3/493* (2013.01); *H04M 2250/74* (2013.01)

(58) Field of Classification Search
CPC ................. G08C 19/28; G10L 15/20
(Continued)

(56) References Cited

U.S. PATENT DOCUMENTS 5,717,319 A * 2/1998 Jokinen .................. G05F 1/577
323/269
6,070,140 A * 5/2000 Tran ........................ G10L 15/26
704/232
(Continued)

FOREIGN PATENT DOCUMENTS

CN 201601759 U 10/2010
CN 102065260 A 5/2011
(Continued)

OTHER PUBLICATIONS

"AN-2173 I2C Communication Over FPD-Link III with Bidirectional Control Channel," Application Report, SNLA131A, Jul. 2011, Revised Apr. 2013, Texas Instruments Incorporated, Dallas, TX, 6 pages
(Continued)

*Primary Examiner* — Vernal Brown
(74) *Attorney, Agent, or Firm* — Toler Law Group, PC

(57) ABSTRACT

A method and apparatus for performing a function in a mobile device are disclosed. A media sound from a sound output device external to the mobile device is captured and a sound feature is extracted from the captured media sound. A function to be performed in the mobile device is determined by identifying at least one reference sound feature in a set of reference sound features based on the extracted sound feature, each reference sound feature in the set of reference sound features being associated with at least one of a plurality of media sounds and at least one of a plurality of functions. Further, the determined function is performed in the mobile device.

35 Claims, 19 Drawing Sheets

(51) Int. Cl.
*H04M 1/27* (2006.01)
*G06F 3/16* (2006.01)
*H04M 3/493* (2006.01)

(58) Field of Classification Search
USPC ............ 340/12.22, 5.61, 4, 11, 4.4; 704/233
See application file for complete search history.

(56) References Cited

U.S. PATENT DOCUMENTS

| | | | |
|---|---|---|---|
| 6,321,199 B1* | 11/2001 | Theimer et al. | 704/275 |
| 6,766,295 B1* | 7/2004 | Murveit | G10L 15/30 379/88.01 |
| 7,106,103 B2 | 9/2006 | Smith et al. | |
| 7,308,516 B2 | 12/2007 | Dressen et al. | |
| 8,077,022 B2* | 12/2011 | Baruco | B60R 25/257 340/426.13 |
| 8,185,680 B2 | 5/2012 | Drexler et al. | |
| 2005/0138105 A1* | 6/2005 | Lee | H04M 1/72544 709/200 |
| 2006/0031618 A1 | 2/2006 | Hansquine et al. | |
| 2006/0129637 A1 | 6/2006 | Yoshida | |
| 2007/0038457 A1* | 2/2007 | Hwang et al. | 704/270 |
| 2008/0167867 A1* | 7/2008 | Fein | H03G 3/32 704/231 |
| 2009/0060211 A1* | 3/2009 | Sakurai | G10H 1/0008 381/56 |
| 2011/0019833 A1* | 1/2011 | Kuech | G10L 21/0208 381/66 |
| 2011/0069937 A1* | 3/2011 | Toerner | 386/250 |
| 2011/0289098 A1 | 11/2011 | Oztaskent et al. | |
| 2012/0084148 A1* | 4/2012 | Won | 705/14.49 |
| 2012/0226497 A1* | 9/2012 | You et al. | 704/231 |
| 2013/0041661 A1* | 2/2013 | Lee | G10L 15/26 704/235 |

FOREIGN PATENT DOCUMENTS

| | | |
|---|---|---|
| EP | 1176503 | 1/2002 |
| EP | 1581026 A1 | 9/2005 |
| JP | H11120468 A | 4/1999 |
| JP | 2007215198 A | 8/2007 |
| JP | 2011243204 A | 12/2011 |
| WO | 2011088053 | 7/2011 |

OTHER PUBLICATIONS

Rutter D.A, "SIRI A Primer", Dec. 31 2011, 8 pp.
International Search Report and Written Opinion—PCT/US2013/023607—ISA/EPO—May 15, 2013, 16 pp.
Ke., et al.,"Computer Vision for Music Identification," IEEE Computer Society Conference on Computer Vision and Pattern Recognition [online], IEEE, Jul. 25, 2005, IEEE Xplore 6. Jpn. Pat. Appln. KOKAI Publication No. 2007-215198.

* cited by examiner

CONTROLLING MOBILE DEVICE BASED ON SOUND IDENTIFICATION

CLAIM OF PRIORITY UNDER 35 U.S.C. §119

The present Application for Patent claims priority to Provisional Application No. 61/596,576 filed Feb. 8, 2012, and assigned to the assignee hereof and hereby expressly incorporated by reference herein.

TECHNICAL FIELD

The present disclosure relates generally to controlling functions on portable computing devices. More specifically, the present disclosure relates to controlling a mobile device based on sound identification.

BACKGROUND

In recent years, the use of mobile devices such as smartphones and tablet computers has become widespread. These devices typically provide a voice and data communication capability over wireless networks. In addition, such mobile devices allow users to perform a variety of functions such as browsing the Internet, taking pictures or videos, making phone or video calls, etc. As such, most users carry such a mobile device with them at all times for the convenient feature.

However, mobile devices are often operated in undesirable situations. For example, users of mobile phones are often expected to have their mobile phones turned off in certain situations such as a movie theater. Despite their best intentions, some users may forget to turn off their phones which may annoy the nearby audience.

Further, mobile device users are subject to a variety of information in their daily lives. When a user wishes to find out more information on a subject of interest, the user typically performs a search for the information by manually entering a query on his or her mobile device. For a user on the road, this may not be a very convenient task.

Therefore, there is a need for a method and apparatus that can automatically perform a function in a mobile device without a manual input by a user.

SUMMARY

The present disclosure provides methods, systems and devices for controlling functionality on a mobile device based on sound identification.

According to one aspect of the present disclosure, a method for controlling a mobile device is disclosed. In the method, a media sound from a sound output device external to the mobile device is captured, and a sound feature is extracted from the captured media sound. The function to be performed by the mobile device is determined by identifying at least one reference sound feature in a set of reference sound features based on the extracted sound feature, each reference sound feature in the set of reference sound features being associated with at least one of a plurality of media sounds and at least one of a plurality of functions. The determined function is performed in the mobile device. Further, the method may include applying at least one basis filter to generate the sound feature. This disclosure also describes a device, a system, a server, a combination of means, and a computer-readable medium relating to this method.

According to another aspect of the present disclosure, a method for performing a function in a mobile device is disclosed. In the method, a composite sound including at least one media sound is captured by a plurality of sound sensors. The at least one media sound is separated from the composite sound. Also, the function to be performed in the mobile device is determined by identifying at least one reference sound feature in a set of reference sound features based on the at least one extracted sound feature. Each reference sound feature in the set of reference sound features is associated with at least one of a plurality of media sounds and at least one of a plurality of functions. The determined function is performed in the mobile device. This disclosure also describes a device, a system, a server, a combination of means, and a computer-readable medium relating to this method.

According to still another aspect of the present disclosure, a server includes a receiver, an identifying unit, and a function determining unit. The receiver is configured to receive a sound feature, the sound feature being extracted from a media sound captured by the mobile device. The identifying unit is configured to identify at least one reference sound feature in a set of reference sound features based on the sound feature, each reference sound feature in the set of reference sound features being associated with at least one of a plurality of media sounds and at least one of a plurality of functions. The function determining unit is configured to determine the function to be performed by the mobile device based on the at least one identified reference sound feature.

According to yet another aspect of the present disclosure, a mobile device includes a sound sensor, a sound feature extractor, an identifying unit, a function determining unit, and a control unit. The sound sensor is configured to capture a media sound from a sound output device external to the mobile device. The sound feature extractor is configured to extract a sound feature from the captured media sound. The identifying unit is configured to identify at least one reference sound feature in a set of reference sound features based on the sound feature, each reference sound feature in the set of reference sound features being associated with at least one of a plurality of media sounds and at least one of a plurality of functions. The function determining unit is configured to determine a function to be performed in the mobile device based on the at least one identified reference sound feature. The control unit is configured to perform the determined function in the mobile device.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
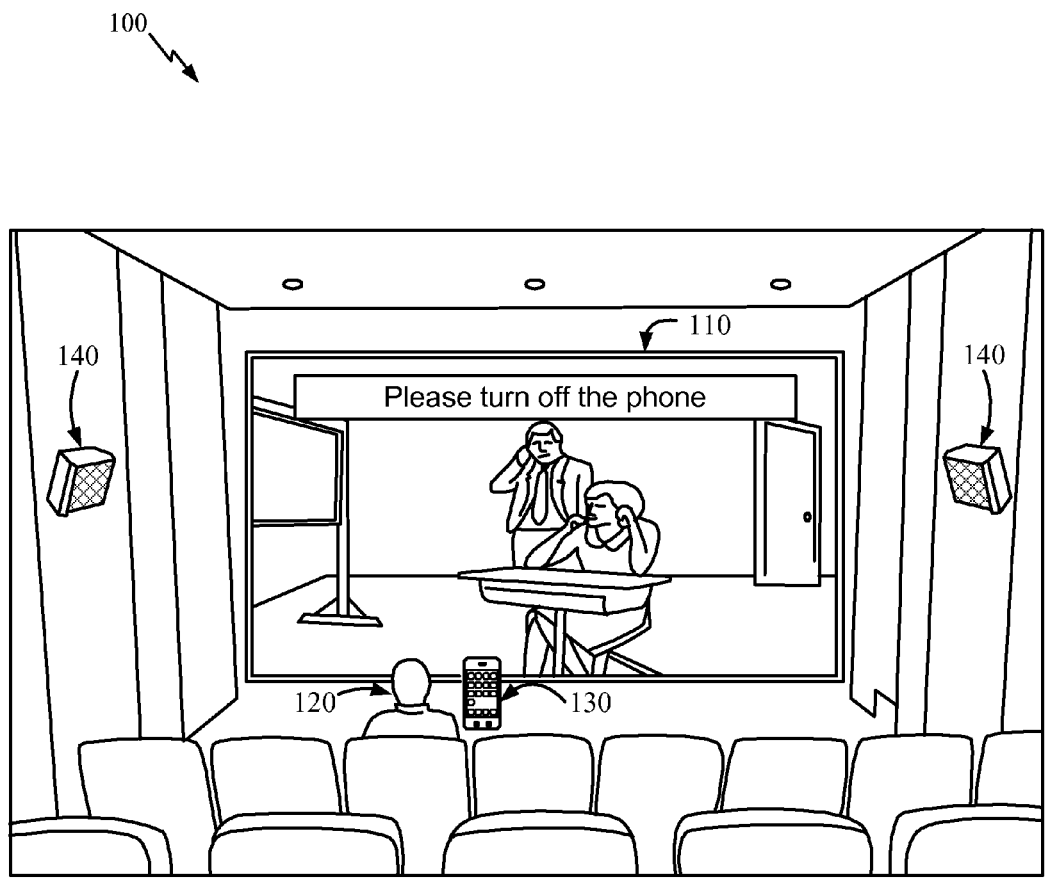
FIG. 1 illustrates a movie theater in which a mobile device is configured to capture a media sound to perform a function according to some embodiments.

FIG. 1 illustrates a movie theater 100 in which a mobile device 130 is configured to capture a media sound to perform a function according to some embodiments. A viewer 120 in the movie theater 100 (e.g., movie goers) may have a mobile device 130. The mobile device 130 may be any suitable device such as a cellular phone, a smartphone, a laptop computer or a tablet personal computer equipped with sound capturing capability, e.g., a microphone, and/or communications capability through a data and/or communications network. The viewer 120 may forget to turn off the mobile device 130 in the movie theater 100.

The mobile device 130 of the viewer 120 is operative to capture environmental sounds. Before a movie starts, the movie theater 100 may play a media sound such as "Please turn off your phone" through one or more speakers 140, and may also display a corresponding visual message on a movie screen 110. The mobile device 130 captures the media sound and extracts a sound feature from the captured media sound.

The media sound that is played through the speakers 140 is a sound that has been captured and recorded for playback. As used herein, a media sound (e.g., a source sound or a sound registered in a database) may be a voice, music, or any type of sound that can be recorded onto a storage medium (e.g., optical, magnetic, or digital media) for playback. The media sound is characterized by a sound feature which uniquely describes or represents the sound and may include an audio fingerprint, a sound signature, or any other sound identifier. The sound feature characterizing the media sound may be associated with a function to be performed by a mobile device, such as turning off the mobile device in response to the media sound. The term "function" (or alternatively referred to as an "action") refers to any operation or instructions for the operation that can be performed or executed in the mobile device.

After extracting the sound feature from the captured media sound, the mobile device 130 may determine a function associated with the extracted sound feature. In the illustrated example, the announcement "Please turn off your phone" may be pre-recorded by a voice actor for playback in the movie theater 100. Once the function is determined, the mobile device 130 performs the function. For example, the mobile device 130 may perform a function of prompting the viewer 120 to turn off the mobile device 130 by providing a visual, audio, or tactile notification. In some embodiments, the mobile device 130 may be configured to automatically turn off the mobile device 130, without requiring an intervention by the viewer 120.

Figure 2:
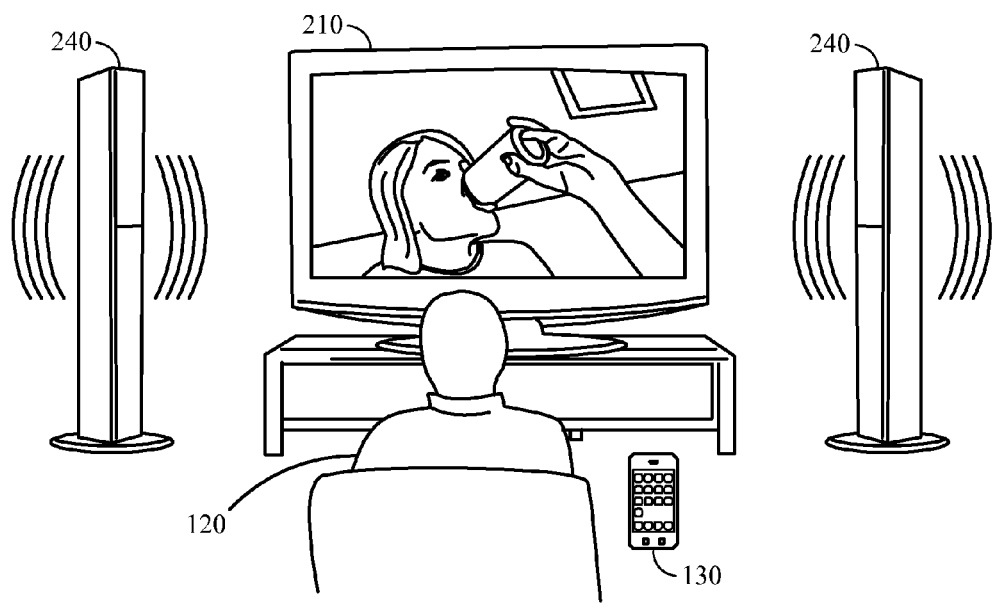
FIG. 2 illustrates a viewer equipped with a mobile device which is configured to perform a function based on a media sound captured from a television, according to some embodiments.

FIG. 2 illustrates a viewer 120 equipped with the mobile device 130 which is configured to perform a function based on a media sound captured from a television 210, according to some embodiments. In the illustrated embodiment, certain sounds that are broadcast from the television 210 may be media sounds, each of which is characterized by a sound feature associated with a mobile device function. When the television 210 broadcasts a media sound, the mobile device 130 captures the media sound and extracts a sound feature from the media sound.

In one embodiment, the television 210 may display a commercial on the screen and at the same time play a media sound associated with the commercial through one or more speakers 240 of the television 210. For example, the television 210 may play an advertisement for a popular canned beverage, and a sound clip relating to the canned beverage that has been pre-recorded (e.g., a person drinking the canned beverage) is captured by the mobile device 130. Once captured, the media sound is digitally processed to extract a unique sound feature for the captured sound clip. The sound feature may be associated with a function to be performed by the mobile device 130, such that the mobile device 130 may automatically perform a search, e.g., an Internet search, for information. In the canned beverage commercial example, the mobile device 130 may automatically perform a search, e.g., via a search engine, to display product details, coupons, or a search result relating to the canned beverage. In another example, the function to be performed by the mobile device 130 may be to perform a search for the latest statistics on football players while the viewer 120 watches a football game on the television 210. In yet another example, the mobile device 130 may perform a search of the website of the television program the viewer 120 is watching, for example a news program or a morning program.

Figure 3:
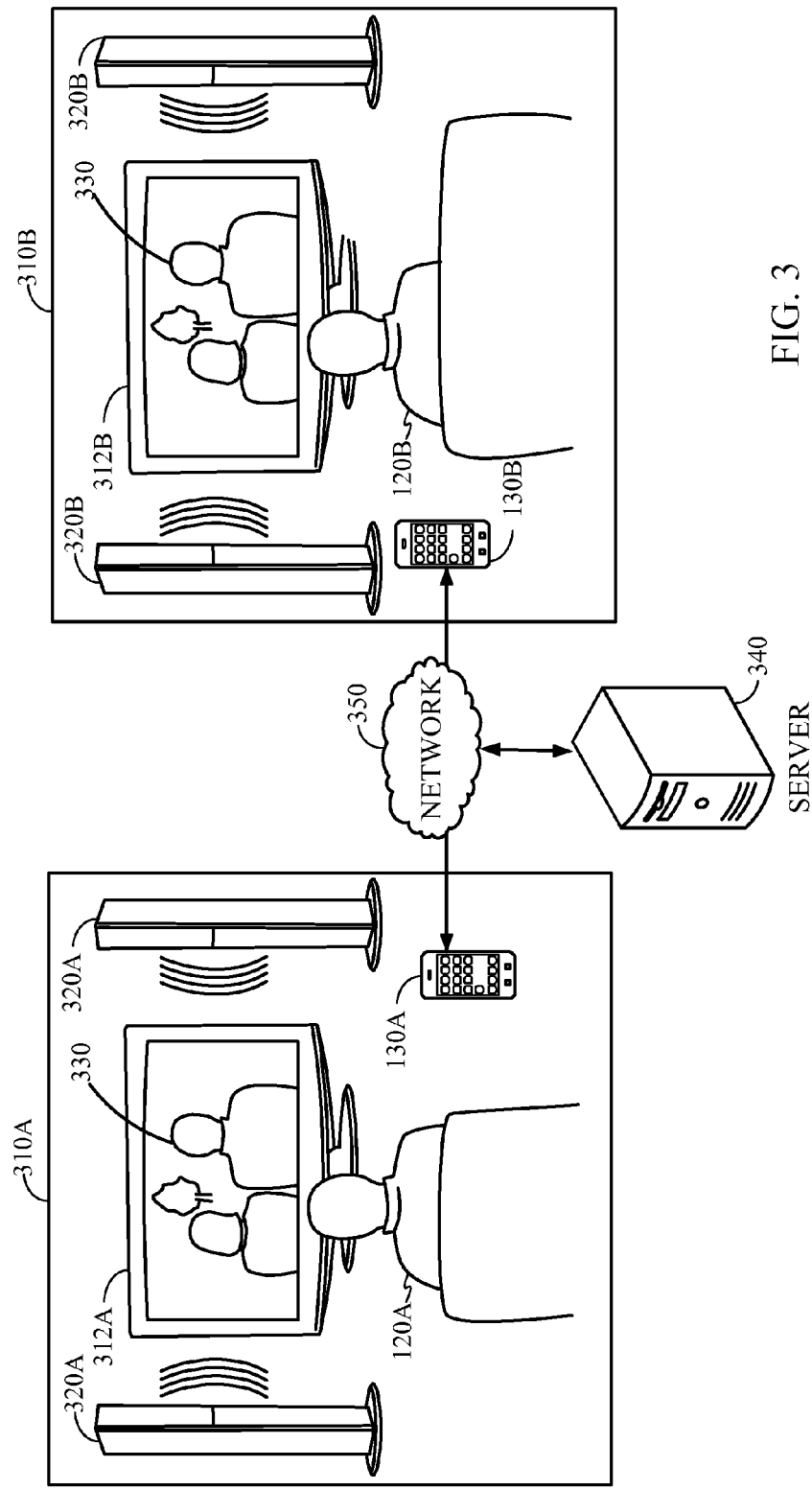
FIG. 3 illustrates viewers equipped with mobile devices, respectively, which are configured to initiate a chat function based on media sounds from televisions, according to some embodiments.

FIG. 3 illustrates viewers 120A and 120B equipped with mobile devices 130A and 130B, respectively, which are configured to initiate a chat function based on media sounds from televisions 312A and 312B, respectively, according to some embodiments. In the illustrated embodiment, the viewer 120A is watching the television 312A at a first location 310A while the viewer 120B is watching the television 312B at a second location 310B. When the viewers 120A and 120B are watching the same television program (e.g., a show, a commercial, a sporting event, and so on), the mobile devices 130A and 130B are configured to capture media sounds broadcast from the televisions 312A and 312B, respectively, and extract sound features from the captured media sounds. For example, when a media sound, such as the voice of an actor 330 in the television program is played through speakers 320A of the television 312A, the mobile device 130A may capture the media sound of the actor 330's voice. Similarly, the mobile device 130B may capture the same media sound of the actor 330's voice through speakers 320B, since the viewers 120A and 120B are watching the same television program.

Once mobile devices 130A and 130B capture the media sounds of the actor 330's voice, the mobile devices 130A and 130B may extract sound features from the captured media sounds and transmit the extracted sound features to a server 340 through a network 350. The network 350 may be any type of network, as well as any combination of networks, including, but not limited to, cellular networks, circuit switching networks, public switching networks, local area networks, wide area networks, wireless networks, and/or packet switching networks, and so on. The server 340 may store a reference sound feature that is extracted from a media sound of the actor 330's voice. The server 340 determines the received sound features from the mobile devices 130A and 130B to represent the same media sound if both sound features are determined to be the same as the reference sound feature.

The server 340 then determines a function associated with the reference sound feature that is to be performed by the mobile devices 130A and 130B. For example, the function may be one that activates similar operations on both mobile devices 130A and 130B, such as initiating a voice or video chat session, a social network service, a text and/or picture exchange service, and so on. The server 340 transmits to the mobile devices 130A and 130B information (e.g., data or instruction) identifying a function to be performed by a mobile device. The mobile devices 130A and 130B may receive the information identifying the function to be performed and perform the function. In one embodiment, the mobile devices 130A and 130B performs the identified function to initiate a communication session (e.g., voice or video chat session) between the viewers 120A and 120B of the mobile devices 130A and 130B, respectively.

In one embodiment, the server 340 may be capable of distinguishing between a sound which is output from a sound output device (i.e., a media sound) and a live sound which is output from a source other than a sound output device (i.e., a sound that is not a media sound) by determining whether captured sounds by the mobile devices 130A and 130B are one of the media sounds registered in a database at the server 340. For example, if the actor 330 is physically present at the second location 310B and talking to the viewer 120B without the television 312B being on, the mobile device 130B may capture the live voice of the actor 330 (i.e., a sound that is not a media sound) and extract a sound feature from the captured voice. On the other hand, the mobile device 130A captures a sound of the actor 330 from the television 312A (i.e., a media sound) to extract a sound feature. The mobile devices 130A and 130B then transmit the extracted sound features to the server 340, which is configured to determine whether the extracted sound features from the mobile devices 130A and 130B are associated with a same reference sound feature. In the case of the sound feature for the live actor's voice captured at the second location 310B, a database at the server 340 will not have a matching reference sound feature and thus, determines that the sound captured by the mobile device 130A is different from the live actor's voice captured by the mobile device 130B. As a result, the server 340 does not provide information identifying a function to be performed by the mobile devices 130A and 130B.

Figure 4:
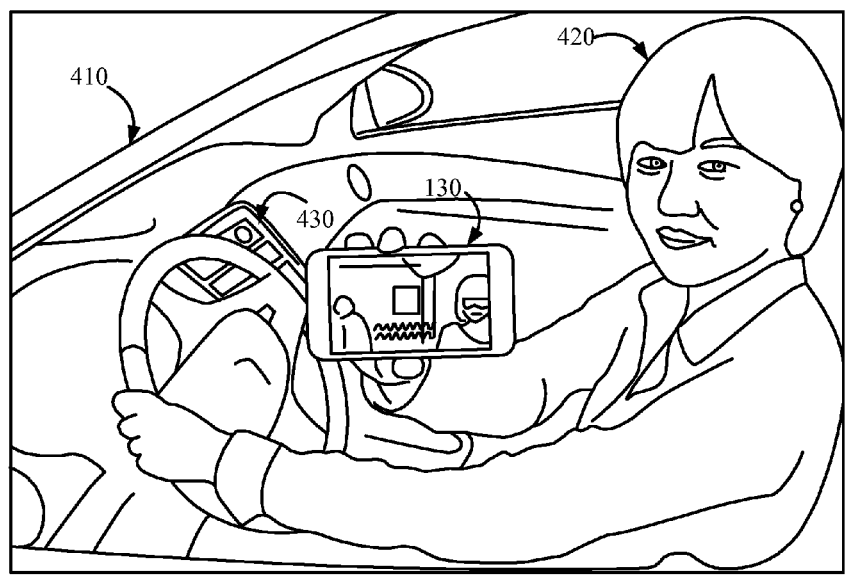
FIG. 4 illustrates a driver equipped with a mobile device which may be configured to perform a function in response to a media sound from a car audio in a car, according to some embodiments.

FIG. 4 illustrates a driver 420 equipped with the mobile device 130 which may be configured to perform a function in response to a media sound from a car audio 430 in a car 410, according to some embodiments. In the illustrated embodiment, the car audio 430 may broadcast a certain sound such as an advertisement, music, news, or a weather report that has been pre-recorded. For example, a sound clip of an advertisement relating to a product may be captured by the mobile device 130 as a media sound. From the captured media sound, the mobile device 130 may extract a sound feature and transmit the extracted sound feature to a server, such as server 340 of FIG. 3. In some embodiments, the mobile device 130 may also transmit location information of the mobile device 130 together with the extracted sound feature to the server 340 by using a location tracking feature of the mobile device 130 such as Global Positioning System (GPS).

After receiving the sound feature from the mobile device 130, the server 340 may determine whether the sound feature is the same as a reference sound feature stored in the server 340. If the server 340 determines that the sound feature received from the mobile device 130 is the same as the reference sound feature, the server 340 may determine a function to be performed by the mobile device 130 and transmit information identifying the function to the mobile device 130. For example, the function may be to provide a list of locations where a product being advertised through the media sound can be purchased. The mobile device 130 receives the information identifying the function from the server 340 and performs the function by displaying the list of the locations in a map or providing detailed information, such as name of a business, locational information and a telephone number.

In another embodiment, the server 340 may determine the function to provide promotional information (e.g., discount vouchers, free service coupon, and so on) based on the advertised product and/or location of the mobile device 130. It will be appreciated that other functions are possible on the mobile device 130, based on any media sound that can be broadcast on the car audio 430, and it needs not be limited to advertisements.

Figure 5:
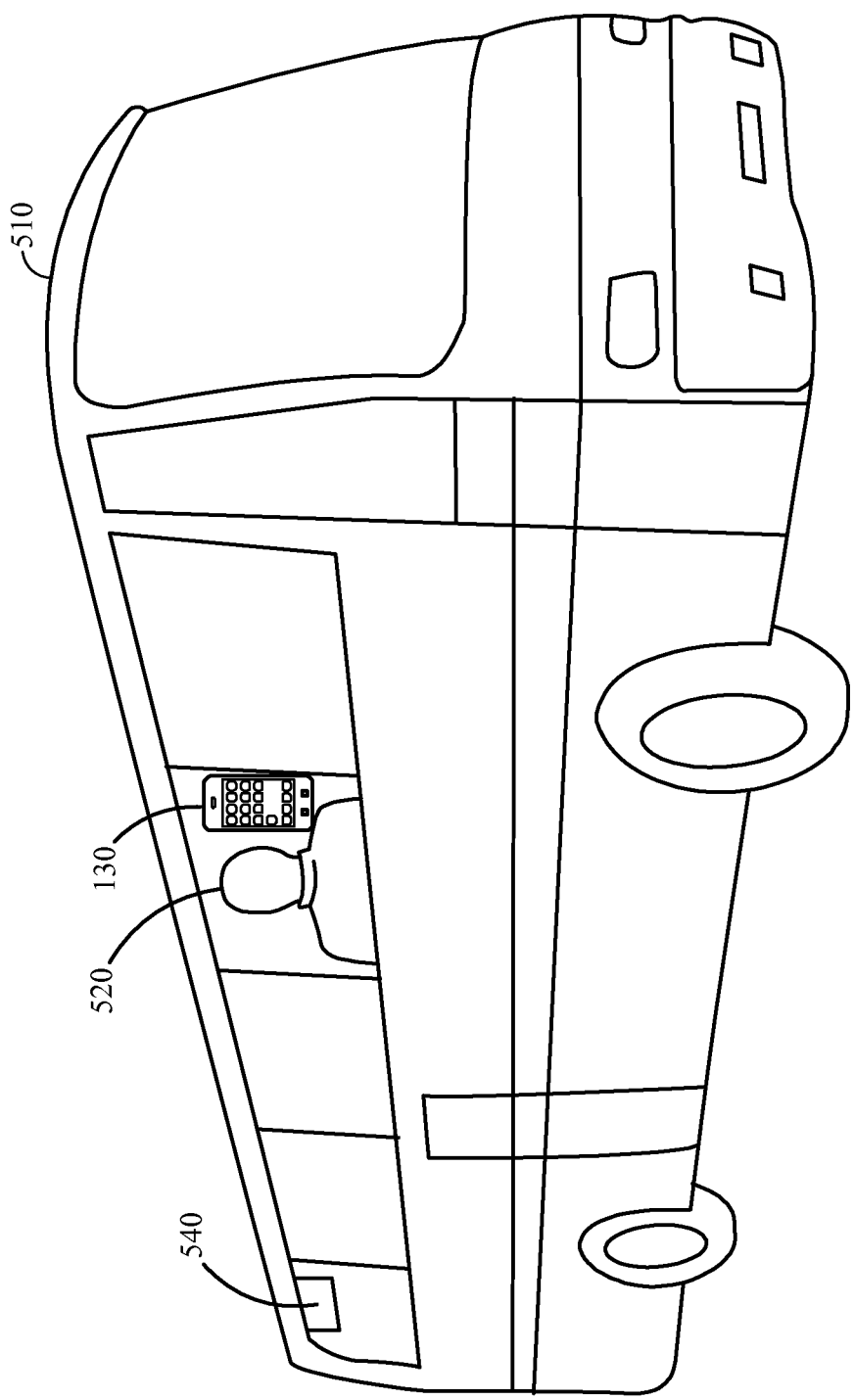
FIG. 5 illustrates a passenger on a bus equipped with a mobile device which may be configured to perform a function in response to a media sound from a speaker in a bus, according to some embodiments.

FIG. 5 illustrates a passenger 520 on a bus 510 equipped with the mobile device 130 which may be configured to perform a function in response to a media sound from a speaker 540 in the bus 510, according to some embodiments. While the passenger 520 is in the bus 510, a media sound such as an announcement may be made through the speaker 540 in the bus 510 to notify the passengers about the next stop. The mobile device 130 of the passenger 520 may be configured to capture such an announcement and process the captured sound to extract a sound feature, which may be processed, as previously described, to execute a function on the mobile device 130.

When an announcement of a next stop is made, the passenger 520 may not hear the announcement if the passenger 520 is listening to music on the mobile device 130 with an earphone. Thus, the mobile device 130 may capture the announcement and, based on the extracted sound feature of the announcement, perform a function of notifying the passenger 520 about the next stop, such as outputting an audio and/or visual message, a tactile notification, or any combination thereof. For example, the mobile device 130 may be configured to stop the music being played to the passenger 520 and/or generate a vibration notification. Further, the mobile device 130 may display a pop-up message (e.g., "Next stop is the destination") on a screen of the mobile device 130. In some embodiments, the passenger 520 may preconfigure the mobile device 130 with destination information to receive a notification when the destination stop is announced.

The mobile device 130 may be configured to perform other functions based on media sounds. For example, the mobile device 130 may be configured to display location information, such as a map or public transportation route based on a pre-recorded announcement of destination stops. In another example, the mobile device 130 may capture a pre-recorded advertisement announced over the speaker 540 of the bus 510 and notify the passenger 520 of product and/or location information associated with the advertised product.

It will be appreciated that in some embodiments, the mobile device 130 may capture media sounds (e.g., from a radio or television program, commercial sound clip, speaker announcement and so on) at any time during the playback. In some embodiments, the media sounds may be captured by the mobile device 130 at certain time intervals. For example, in the case of watching a television program as illustrated in FIG. 3, if the viewer 120B tunes to the same television program at a later time than the viewer 120A, the mobile devices 130A and 130B will initiate a chat service the next time when a media sound is played on the television 312B having the associated sound feature.

Figure 6A:
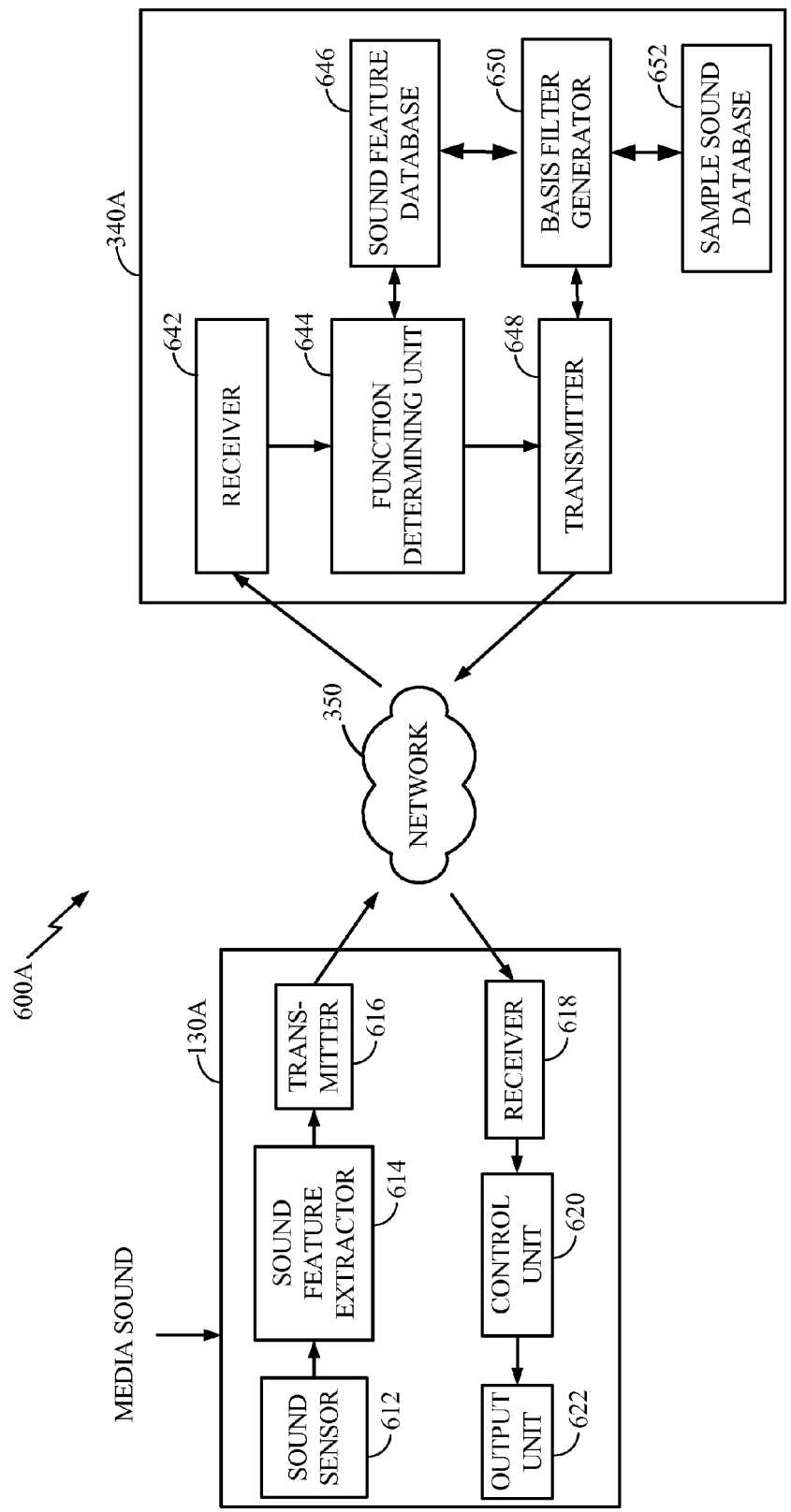
FIG. 6A is a block diagram illustrating a system configured to determine a function to be performed in a mobile device based on a sound feature extracted from a media sound, according to some embodiments.

FIG. 6A is a block diagram illustrating a system 600A configured to determine a function to be performed in the mobile device 130A based on a sound feature extracted from a media sound, according to some embodiments. The system 600A may include the mobile device 130A and the server 340A connected via the network 350. The mobile device 130A may include a sound sensor 612, a sound feature extractor 614, a transmitter 616, a receiver 618, a control unit 620, and an output unit 622. The sound sensor 612 is configured to capture a media sound having at least one unique sound feature, which can be used to identify a function associated with the media sound, such as turning off the phone, sending a notification, or conducting a search on the Internet and providing the search result. For example, the sound sensor 612 may include one or more microphones or any other type of sound sensors used to detect, sense, and/or capture the ambient sound of the surroundings. The sound sensor 612 may be a microphone built into the mobile device 130A for telephone calls or recording videos, or a microphone dedicated to receive ambient sound. The sound feature extractor 614 receives the media sound from the sound sensor 612 and extracts a unique sound feature (e.g., audio fingerprint or sound signature) from the media sound by using suitable signal processing methods, including speech and audio coding, compression, recognition and analysis methods. For example, such methods include spectrum analysis, MFCC (Mel-frequency cepstral coefficients), LPC (linear predictive coding), and/or LSP (line spectral pair) techniques, which are well-known methods for audio fingerprinting, speech recognition or speech and audio coding. Also, as described in more detail below, the unique sound feature may be extracted by applying a basis filter to the captured media sound.

The transmitter 616 of the mobile device 130A is configured to transmit the extracted sound feature to the server 340A via the network 350. The server 340A processes the sound feature received from the mobile device 130A to determine a function to be performed by the mobile device 130A and provides information identifying the function to the mobile device 130A via the network 350, as will be described in more detail below. The receiver 618 of the mobile device 130A is configured to receive the information identifying the function determined based on the sound feature and transmit the information identifying the function to the control unit 620, which is configured to perform the function in the mobile device 130A. For example, the control unit 620 may perform the function by turning off the mobile device 130A or displaying a notification message through the output unit 622.

The server 340A is configured to determine a function to be performed on the mobile device 130A based on the sound feature received from the mobile device 130A. The server 340A may include a receiver 642, a function determining unit 644, a sound feature database 646, a basis filter generator 650, a transmitter 648, and a sample sound database 652. The receiver 642 is configured to receive the sound feature from the mobile device 130A and provides the sound feature to the function determining unit 644 for determining a function to be performed by the mobile device 130A.

The function determining unit 644 is configured to access the sound feature database 646 to identify a reference sound feature having a greatest similarity to the received sound feature. The sound feature database 646 includes a plurality of reference sound features, each of which has been extracted from a media sound and is associated with a function to be performed by a mobile device. In one embodiment, an extracted sound feature or a reference sound feature may be represented by any suitable set of values that uniquely describes or represents a media sound. For example, the set of values may correspond to a frequency domain spectrum, a power domain spectrum, or the like. The media sound is characterized by a sound feature which uniquely describes or represents the sound and may include an audio fingerprint, a sound signature, or any other sound identifier. Accordingly, the sound feature database 646 may be constructed from a plurality of extracted sound features or reference sound features, each of which has an associated function. As described herein, when a sound feature has been extracted from a media sound and included in the sound feature database 646 along with an associated function, the media sound may be considered to have been registered in the sound feature database 646. Thus, when an input media sound has been registered in the sound feature database 646, a corresponding function to be performed by a mobile device can be identified from the sound feature database 646.

As illustrated in Table 1 below, the sound feature database 646 may include a plurality of reference sound features 1 to N, each of which is associated with a function to be performed. For example, the reference sound feature 1 is associated with the function "Turn off the phone" while the reference sound feature 2 may be associated with the function of conducting a product search on the Internet and providing a search result.

TABLE 1

| Reference Sound Features | Function to be Performed |
| --- | --- |
| Reference sound feature 1 | Turn off the phone |
| Reference sound feature 2 | Conduct "product" search on Internet and provide the search result |
| . | . |
| . | . |
| . | . |
| Reference sound feature N | Function N |

The basis filter generator 650 in the server 340A is configured to generate one or more basis filters that may be applied to the extracted sound feature by using sample sounds of the sample sound database 652. Further, the basis filters may be used to update the sound feature database 646 to improve the accuracy of the sound feature database 646. Specific operations of the basis filter generator 650 are provided in more detail below.

Based on the received sound feature, the function determining unit 644 accesses the sound feature database 646 and determines a reference sound feature that has the greatest similarity to the received sound feature. Once the reference sound feature has been identified from the sound feature database 646, the function determining unit 644 determines a function associated with the identified reference sound feature from the sound feature database 646. The server 340A transmits information identifying the function to the mobile device 130A via the transmitter 648 through the network 350. The control unit 620 of the mobile device 130A receives the information identifying the function from the server 340A via the receiver 618 and performs the function in the mobile device 130A by, for example, turning off the mobile device 130A or displaying a notification message through the output unit 622.

In one embodiment, the mobile device 130A or 130B may be configured to automatically perform sound processing functions, without requiring a user intervention. In other words, the user does not need to manually initiate performance of the functions on the mobile device 130A or 130B. In this case, the sound sensor 612 of the mobile device 130A or 130B may, for example, capture environmental sounds continuously to recognize a registered media sound in order to determine a function to be performed on the mobile device 130A or 130B. However, while the mobile devices 130A or 130B operate to capture and process environmental sounds continuously, power is generally consumed from a battery, which is typically limited in capacity. Thus, in order to conserve the battery, power consumption of the mobile device 130A or 130B may be reduced by operating in a low-power mode, as described in some embodiments below.

In some embodiments, the mobile device 130A may capture an environmental sound at a predetermined time interval to reduce power consumption. In this case, components in the mobile device 130A that are used to capture or process the environmental sound may be activated at the predetermined time interval (e.g., sound with a duration of 10 ms at an interval of 100 ms). For example, such components may be configured to be in an "active state" (i.e., in a high-power state) for 10 ms and in an "idle state" (i.e., in a low-power state or off state) for the next 90 ms. During the active state, the mobile device 130A captures an environmental sound and determines if the captured sound exceeds a predetermined threshold sound level (e.g., power level). If the sound level of the captured sound exceeds the threshold sound level, the mobile device 130A may process the captured sound to determine a function to be performed on the mobile device 130A. In the idle state, the components that are used for capturing or processing environmental sounds are inactive for 90% of the duty cycle. Thus, in such a case, the mobile device 130A may save as much as 90% of power in sound processing over the case of capturing and processing environmental sounds continuously.

The mobile device 130A may also be configured to determine whether a captured sound is a media sound such as speech or music. In one embodiment, the sound sensor 612 may include a digital signal processor ("DSP") to determine whether a captured sound is a media sound to distinguish from non-media sounds such as noise. For example, when the sound level of the captured sound is determined to exceed the threshold sound level, the DSP may be activated to determine if the captured sound is a media sound or not by using suitable signal processing methods, such as Gaussian Mixture Model with MFCC (Mel-frequency cepstral coefficients). If the DSP determines that the captured sound is a media sound such as speech or music, the captured sound is provided to the sound feature extractor 614 for further processing as described above. On the other hand, if the DSP determines that the captured sound is not a media sound, the captured sound is not processed further. By identifying and discarding non-media sounds at the front end of sound processing, the mobile device 130A may save substantial power over the case of processing all captured sounds.

Figure 6B:
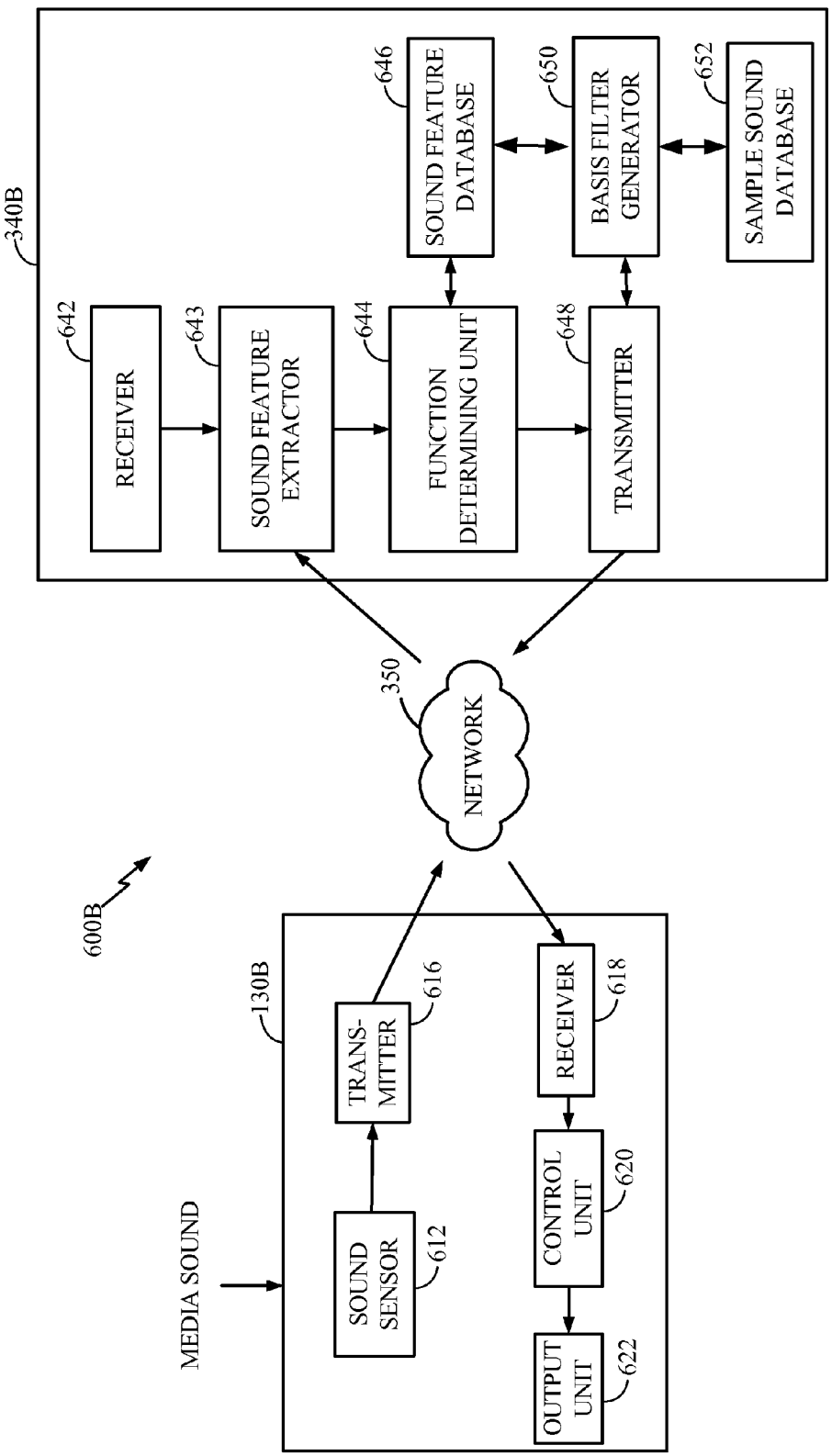
FIG. 6B is a block diagram illustrating a system in which a server is configured to determine a function to be performed in a mobile device based on a media sound received from the mobile device, according to some embodiments.

FIG. 6B is a block diagram illustrating a system 600B in which a server 340B is configured to determine a function to be performed in a mobile device 130B based on a media sound received from the mobile device 130B, according to another embodiment. As illustrated, the system 600B includes the mobile device 130B and the server 340B connected via network 350. In this embodiment, the sound feature extractor 643 is included in the server 340B rather than the mobile device 130B, in contrast to the system 600A of FIG. 6A. After the sound sensor 612 of the mobile device 130B captures a media sound, the mobile device 130B transmits the media sound directly to the server 340B through the transmitter 616.

In the server 340B, the receiver 642 receives the media sound transmitted from the mobile device 130B and provides the received media sound to the sound feature extractor 643. The sound feature extractor 643 is configured to extract a unique sound feature from the media sound. The server 340B may then process the extracted sound feature in the same manner as described above in connection with FIG. 6A, to determine a function to be performed by the mobile device 130B and provide information identifying the function to the mobile device 130B via network 350.

Figure 7:
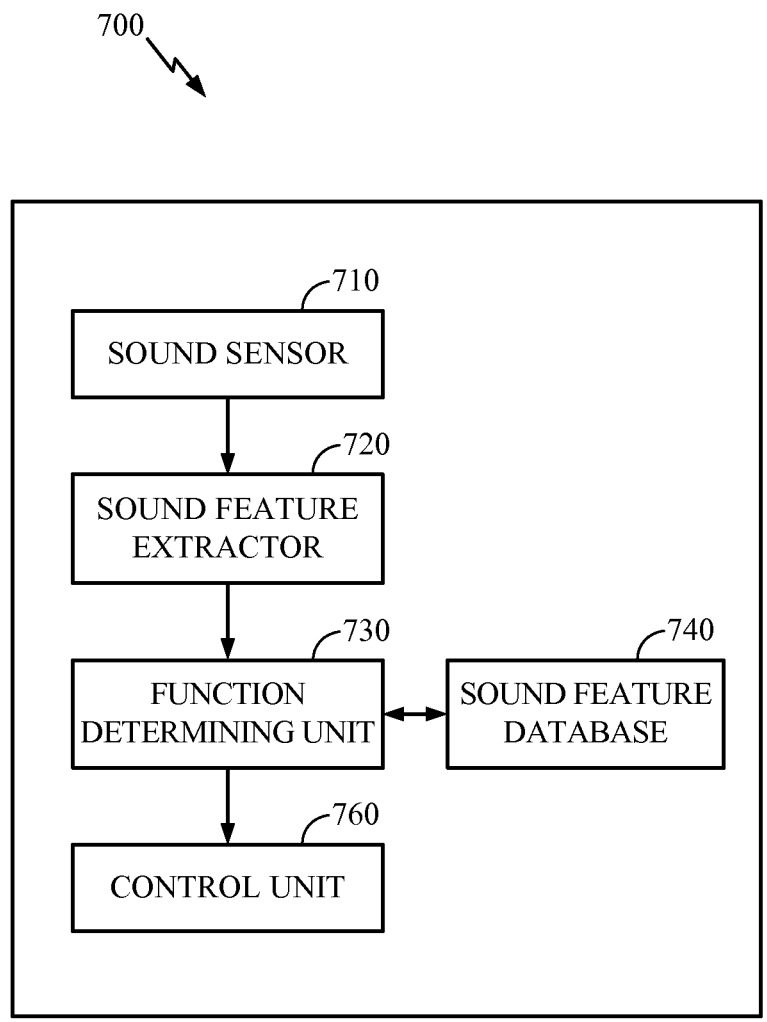
FIG. 7 illustrates a block diagram of a mobile device, which includes a sound feature database for determining a function to be performed, according to some embodiments.

FIG. 7 illustrates a block diagram of a mobile device 700, which includes a sound feature database 740 for determining a function to be performed, according to some embodiments. The mobile device 700 includes a sound sensor 710 configured to capture a media sound having at least one unique sound feature and a sound feature extractor 720 configured to receive the media sound from the sound sensor 710 and extract a sound feature (e.g., an audio fingerprint) from the captured media sound. The mobile device 700 additionally includes a function determining unit 730 configured to compare the extracted sound feature to a plurality of reference sound features stored in the sound feature database 740.

The function determining unit 730 is configured to access the sound feature database 740 to identify a reference sound feature having a greatest similarity to the received sound feature. As described above, the sound feature database 740 includes a plurality of reference sound features, each of which has been extracted from a media sound and is associated with a function to be performed by a mobile device. The plurality of reference sound features of the sound feature database 740 may be updated locally in the mobile device 700 or remotely in communication with a server. For example, a user may operate the mobile device 700 to capture a media sound and input an associated function to the mobile device 700. The mobile device 700 may then extract a reference sound feature from the captured media sound and store the extracted reference sound feature with the associated function in the sound feature database 740. Alternatively, the sound feature database 740 may download a reference sound feature with an associated function from a remote server. From the sound feature database 740, the function determining unit 730 determines a function associated with the identified reference sound feature. Based on the determined function from the function determining unit 730, the control unit 760 performs the function in the mobile device 700.

Figure 8:
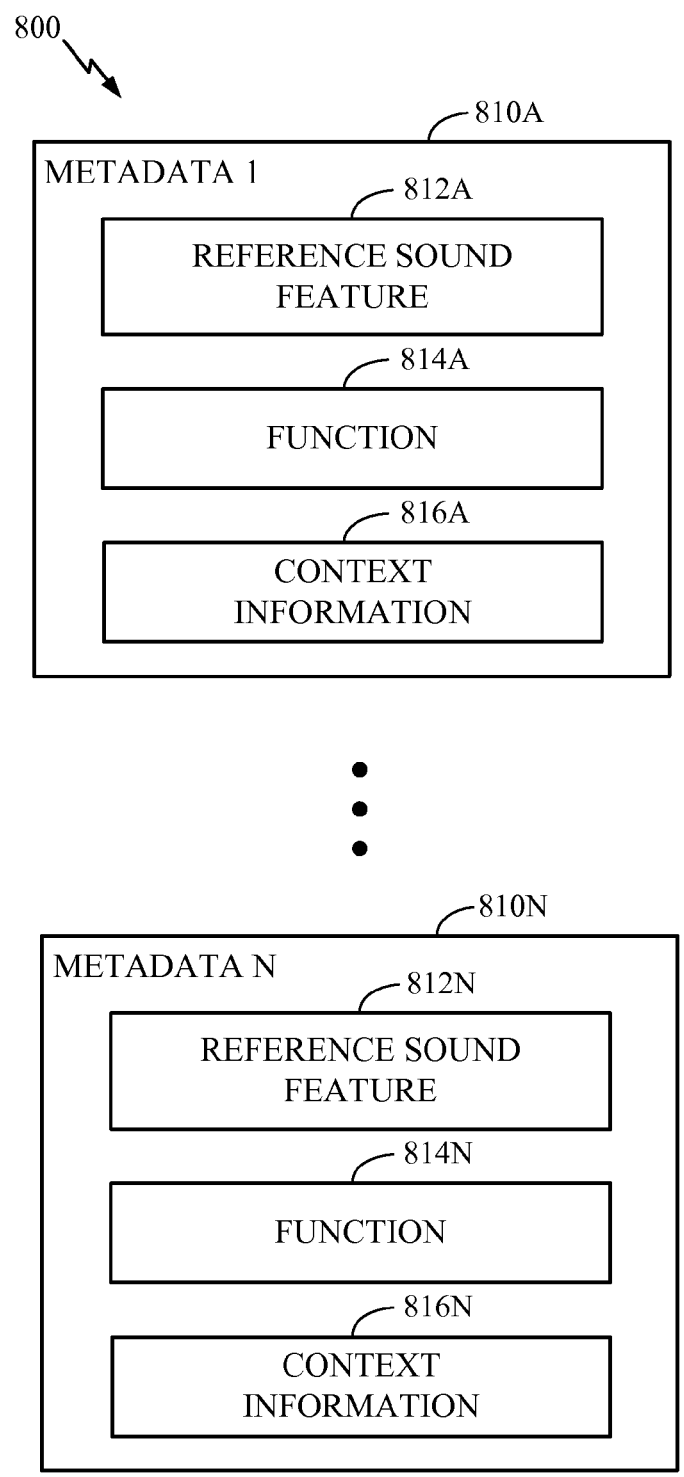
FIG. 8 is a block diagram illustrating a data structure of a sound feature database according to one embodiment.

FIG. 8 is a block diagram illustrating a data structure 800 of the sound feature database 646 according to one embodiment. Although the sound feature database 646 of FIG. 6A and FIG. 6B may be described by the data structure 800, the sound feature database 740 of FIG. 7 may also use the data structure 800. The data structure 800 includes a plurality of meta-data 810A to 810N, which include reference sound features 812A to 812N, functions 814A to 814N, and context information 816A to 816N, respectively. The context information 816A to 816N may provide additional information or parameters for the reference sound features 812A to 812N, respectively. Thus, each of the meta-data 810A to 810N describes characteristics of a corresponding reference sound feature. For example, a media sound "Please turn off the phone" may be represented by meta-data 810A that includes a reference sound feature 812A extracted from the media sound, a function 814A to be performed on the mobile device (e.g., turning off the mobile device or adjusting the configuration of the mobile device to a silent mode), and context information 816A that identifies the environmental context in which the media sound may be captured (e.g., a movie theater).

The meta-data 810A to 810N may be pre-generated locally in the server 340 or another remote server, and stored in the sound feature database 646. The meta-data 810A, for example, may be generated by extracting the reference sound feature 812A from a target media sound, and providing a desired function as the function 814A associated with the reference sound feature 812A. Additional information or parameters that may describe or characterize the reference sound feature 812A can be provided as the context information 816A. The meta-data 810A to 810N generated in the above manner may be uploaded to the server 340 and stored in the sound feature database 646.

Figure 9:
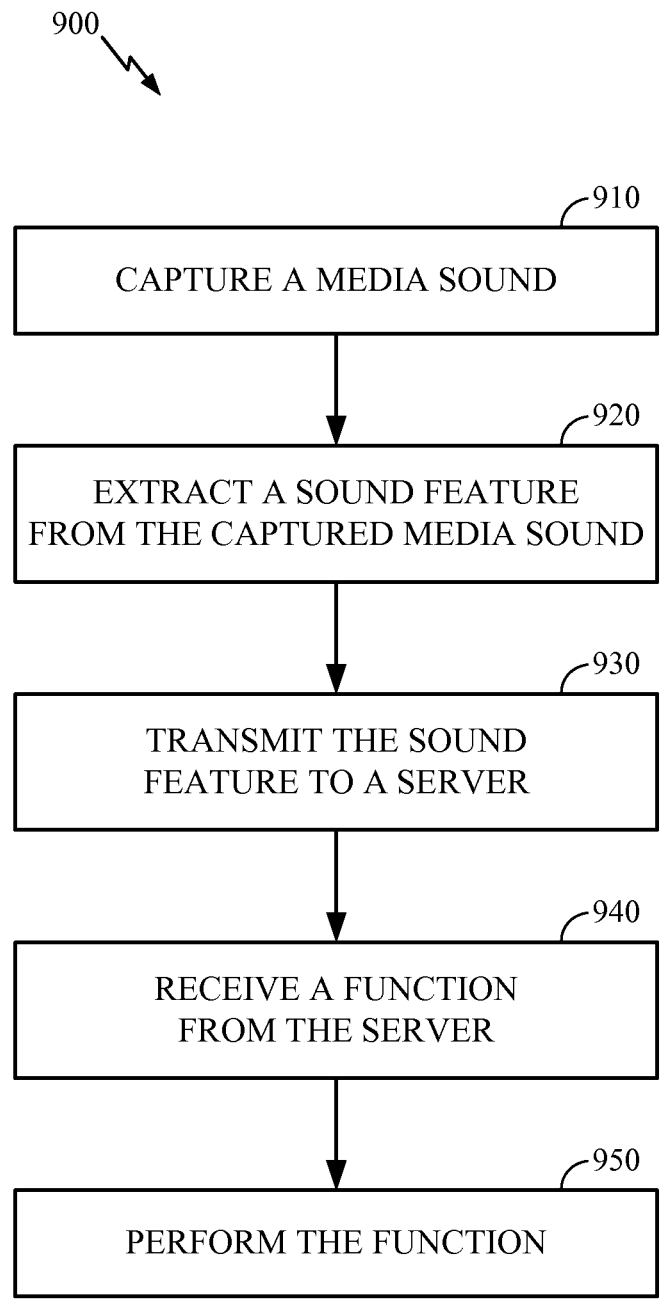
FIG. 9 is a flowchart of a method for performing a function by a mobile device based on a sound feature extracted from a media sound by determining the function to be performed in a server, according to some embodiments.

FIG. 9 is a flowchart of a method 900 for performing a function by the mobile device 130 based on a sound feature extracted from a media sound by determining the function to be performed in the server 340, according to some embodiments. Initially, the mobile device 130 captures a media sound that is played back via a sound output device (e.g., speakers 140 in a movie theater 100 as shown in FIG. 1) at 910. The mobile device 130 processes the captured sound, at 920, to extract a sound feature from the captured media sound. At 930, the mobile device 130 transmits the extracted sound feature to the server 340, which determines the function to be performed by the mobile device 130 and transmits information identifying the function to the mobile device 130 over a network. The mobile device 130 receives the information identifying the function from the server 340 at 940 and performs the function at 950.

Figure 10:
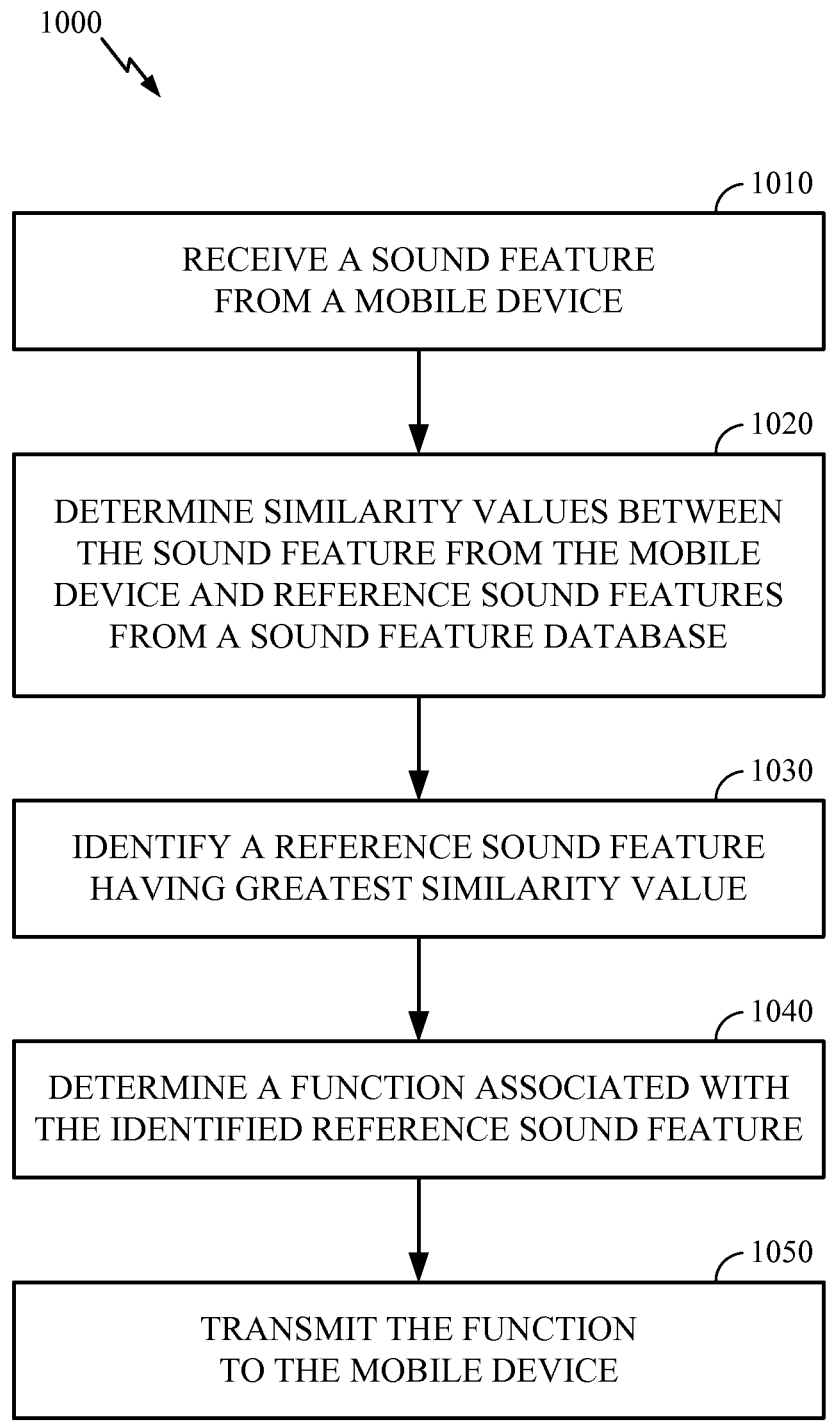
FIG. 10 is a flowchart of a method performed by a server for determining a function to be performed in a mobile device based on a sound feature of a media sound, according to some embodiments.

FIG. 10 is a flowchart of a method 1000 performed in the server 340 for determining a function to be performed in the mobile device 130 based on a sound feature of a media sound, according to some embodiments. The server 340 receives the extracted sound feature from the mobile device 130, at 1010. Then at 1020, the server 340 determines similarity values between the extracted sound feature from the mobile device 130 and each of the reference sound features from the sound feature database 646. After determining the similarity values, the server 340 determines the greatest similarity value and identifies a reference sound feature in the sound feature database 646 that is associated with the greatest similarity value, at 1030. In one embodiment, if the greatest similarity value is less than a predetermined threshold, no reference sound feature is identified and thus the server 340 may transmit a response to the mobile device 130 indicating that no function has been identified for the transmitted sound feature. Once the reference sound feature having the greatest similarity value has been determined, the server 340 determines, at 1040, a function associated with the identified reference sound feature from the sound feature database 646. Then at 1050, the server 340 transmits information identifying the determined function to the mobile device 130 through the network.

Figure 11:
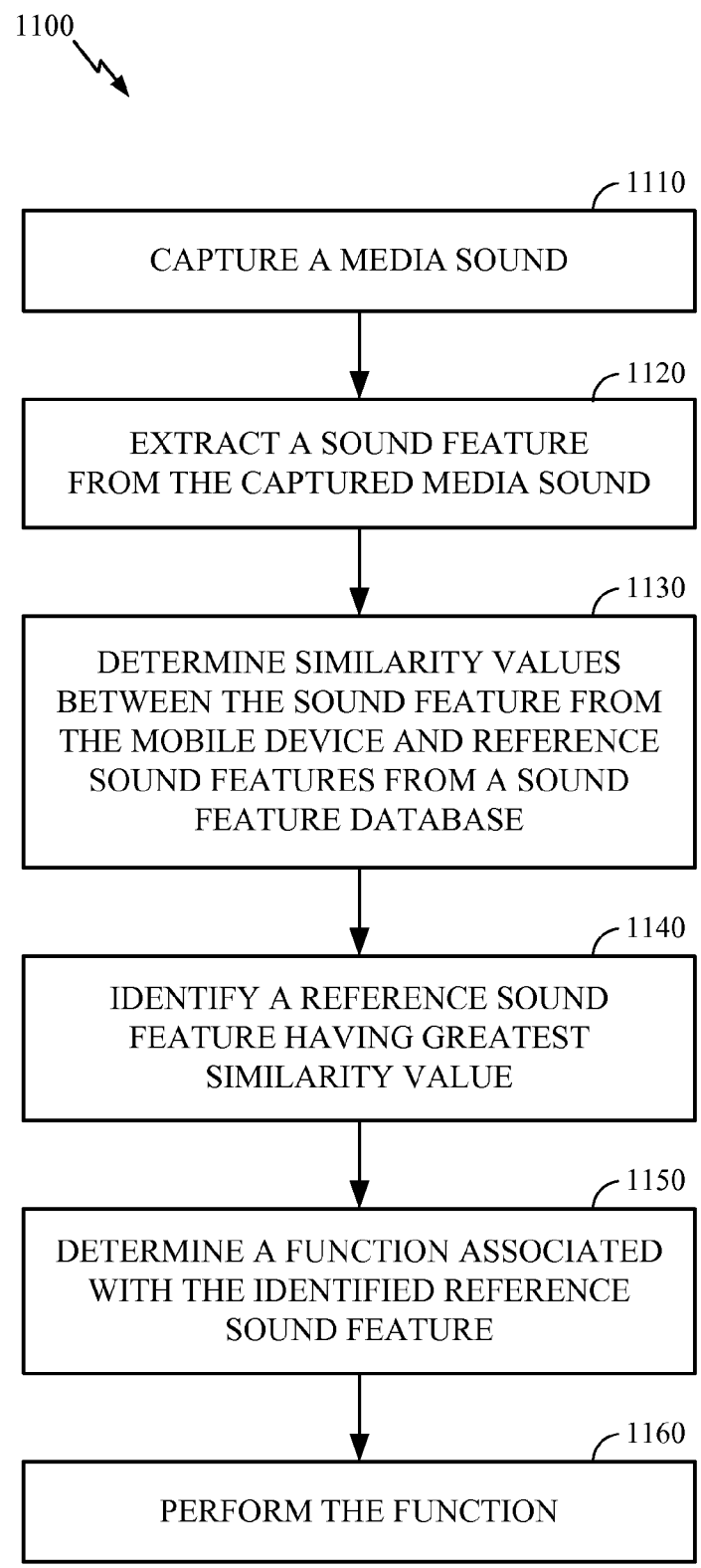
FIG. 11 is a flowchart of a method performed by a mobile device for determining and performing a function based on a media sound, according to some embodiments.

FIG. 11 is a flowchart of a method 1100 performed by the mobile device 130 for determining and performing a function based on a media sound, according to some embodiments. The mobile device 130 initially captures a media sound at 1110. The mobile device 130 processes the captured sound, at 1120, to extract a sound feature from the captured media sound. Then at 1130, the mobile device 130 determines similarity values between the extracted sound feature and each of the reference sound features from a sound feature database in the mobile device 130. After determining the similarity values, the mobile device 130 determines the greatest similarity value and identifies a reference sound feature in the sound feature database that is associated with the greatest similarity value, at 1140. Once the reference sound feature having the greatest similarity value has been determined, the mobile device 130 determines, at 1150, a function associated with the identified reference sound feature from the sound feature database. Then at 1160, the mobile device 130 performs the determined function.

Figure 12:
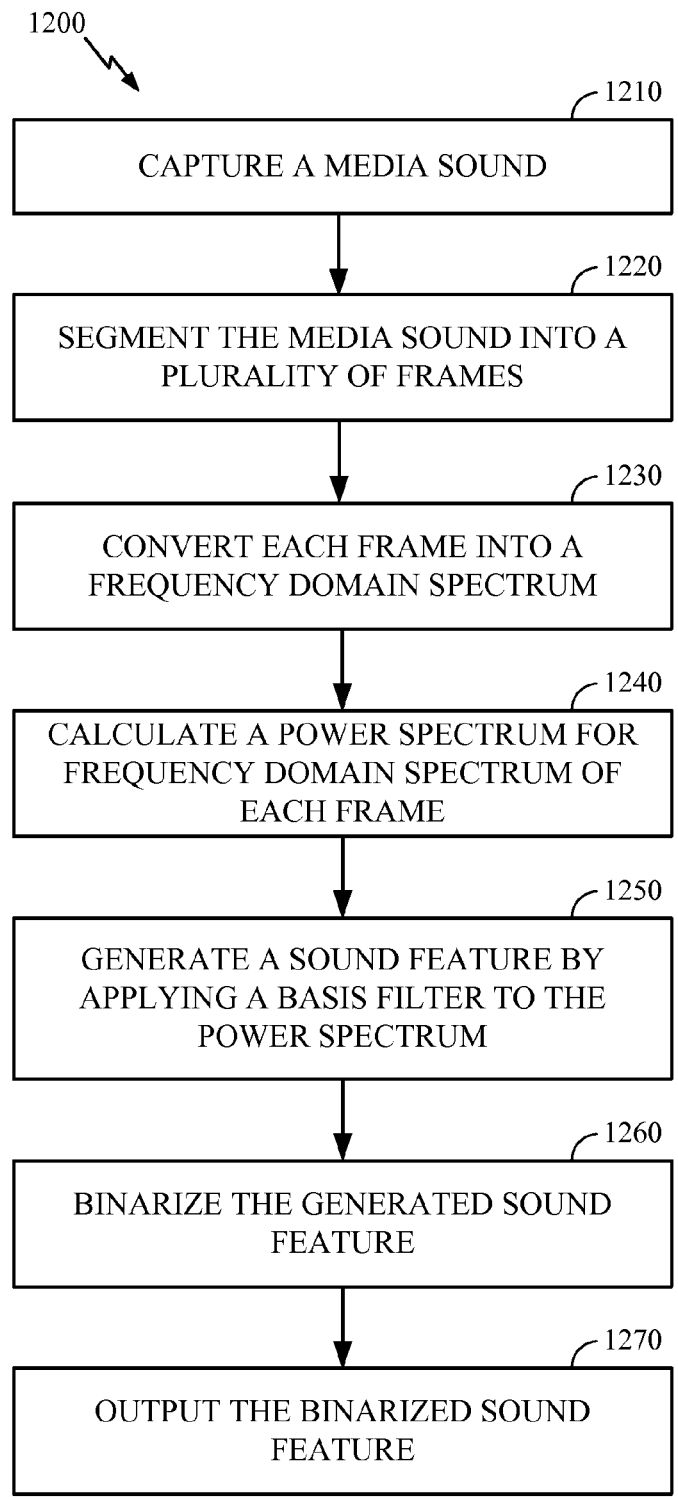
FIG. 12 illustrates a flowchart of a method performed by a mobile device for extracting a sound feature from a media sound based on a basis filter, according to some embodiments.

FIG. 12 illustrates a flowchart of a method 1200 performed by the mobile device 130 for extracting a sound feature from a media sound based on a basis filter, according to some embodiments. The sound sensor 612 of the mobile device 130 initially captures a media sound at 1210. The sound feature extractor 614 of the mobile device 130 receives the captured media sound from the sound sensor 612 and segments the media sound into a plurality of frames having a predetermined time period (which may also be referred to as "windowing"), at 1220. In one embodiment, the adjacent frames are segmented to overlap such that a portion of the frames is common to the frames. In such a case, the time period for the overlapping portion may be predetermined. The time period for the frames and the overlapping portions may be adjusted to achieve a desired level of accuracy in sound uniqueness. For example, a smaller time period for the frames and/or the overlapping portions may lead to a greater accuracy by enhancing sound uniqueness.

After segmenting the media sound into a plurality of frames, each frame is converted into a frequency domain spectrum at 1230, by using, for example, a Fast Fourier Transform (FFT). Alternatively, several other transformation processes (e.g., including, but not limited to, Discrete Cosine Transform, Haar Transform or Walsh-Hadamard Transform) may be used to convert the frames. In one embodiment, the converted frames in the frequency domain spectrum may be used as an extracted sound feature or an intermediate sound feature for generating the extracted sound feature.

For each frequency domain spectrum corresponding to a frame, the sound feature extractor 614 calculates a power spectrum at 1240. In this process, the frequency domain spectrum for each frame may be segmented into frequency bands and an energy value (i.e., power value) in each band is calculated as the power level of the respective frequency band. Accordingly, the calculated energy values of the frequency bands represent a power spectrum of the frame that may be used as an intermediate sound feature to uniquely identify the frame.

Once the power spectrum has been obtained for each frame (i.e., intermediate sound feature of each frame), the sound feature extractor 614 generates, at 1250, a sound feature (i.e., extracted sound feature) by applying a basis filter to each power spectrum. As used herein, a "basis filter" refers to a set of values, a vector, or a matrix that may be applied to an intermediate sound feature (e.g., a power spectrum extracted from the media sound) to generate the extracted sound feature which is more robust to noise and distortion than the intermediate sound feature. The sound feature extracted from the intermediate sound feature by applying the basis filter may represent a higher level feature than intermediate features. For example, the extracted sound feature represents changes or combinations of frequency components of a captured sound, while the intermediate feature only represents frequency components of the captured sound. In another example, the extracted sound feature may represent onset or offset of the captured sound.

The extracted sound feature generated above may consist of a series of values representing a captured sound. The values of the extracted sound feature may then be transformed into a binary form (e.g., "0s" or "1s") by employing any suitable binarization algorithms, at 1260. In one embodiment, each value of the extracted sound feature may be compared to a threshold value to generate a binarized form of the extracted sound feature. For example, if a value of the extracted sound feature is equal to or greater than the threshold value, a bit "1" will be assigned to the value, while if the value is less than the threshold value, a bit "0" will be assigned to the value. In another embodiment, a predetermined number of values among the series of values may be selected and assigned a value of "1," while the remaining values are assigned a value of "0." For example, N greatest values among the series of values may be selected and assigned a value of "1," while the remaining values are assigned a value of "0." After binarization, the binarized sound feature is output as the extracted sound feature at 1270.

In some embodiments, a basis filter may be generated by calculating values or matrices to minimize differences between a reference sound and a distorted sound of the reference sound. As used herein, a "reference sound" (or a "sample sound") and a distorted sound of the reference sound, which may be collectively referred to as a "reference sound set," refer to a set of an original sound without noise (i.e., undistorted reference sound) and an original sound with noise (i.e., distorted reference sound). For example, a reference sound set may be extracted from any original sound without noise such as music or an announcement (i.e., undistorted reference sound) and the same original sound with noise (i.e., distorted reference sound).

According to one embodiment, a basis filter M may be generated to minimize an error E between an undistorted reference sound and its corresponding distorted reference sound, and may be expressed in a matrix form, as follows:

$$E = x_i - M \cdot x_i^k$$

where $x_i$ is a vector indicating intermediate sound features of an i-th undistorted reference sound, and $x_i^k$ is a vector indicating intermediate sound features of a k-th distorted sound of the i-th undistorted reference sound. In the above equation, the error E may be decreased by adjusting or optimizing coefficients for the basis filter M. In some embodiments, the basis filter M may be generated by employing any suitable techniques including, but not limited to, PCA (Principal Components Analysis), OPCA (Oriented Principal Components Analysis), ICA (Independent Component Analysis), Sparse Coding, and other similar algorithms.

Based on the basis filter M above, applying the basis filter M to an intermediate sound feature extracted from a media sound generates a sound feature which is more robust to noise and distortion than the intermediate sound feature. The basis filter M may be generated by the basis filter generator 650 of the server 340, and provided to the mobile device 130 via the transmitter 648 for use in extracting a sound feature. Alternatively, the mobile device 130 may transmit an intermediate sound feature to the server 340, which may use the basis filter M in extracting a sound feature. In another embodiment, the mobile device 130 may transmit a media sound to the server 340, which may extract an intermediate sound feature from the media sound and use the basis filter M in extracting a sound feature. The basis filter M generated as above may be used to generate and update reference sound features in the sound feature database 646.

In some embodiments, when basis filters are generated by an OPCA method, the basis filters may be characterized by a matrix having four rows of basis filters, and a sound feature C may be generated according to the following equation:

$$C = \begin{bmatrix} a_1 & a_2 & \dots & a_n \\ b_1 & b_2 & \dots & b_n \\ c_1 & c_2 & \dots & c_n \\ d_1 & d_2 & \dots & d_n \end{bmatrix} \cdot \begin{bmatrix} f_1 \\ f_2 \\ \vdots \\ f_n \end{bmatrix}$$

where the rows $[a_1\ a_2 \dots a_n]$, $[b_1\ b_2 \dots b_n]$, $[c_1\ c_2 \dots c_n]$, and $[d_1\ d_2 \dots d_n]$ indicate a first basis filter, a second basis filter, a third basis filter, and a fourth basis filter, respectively, while the column $[f_1\ f_2 \dots f_n]$ indicates an intermediate sound feature (e.g., power spectrum) extracted from a media sound. Although the basis filter matrix is illustrated using four basis filters, the basis filter matrix may include any suitable number of basis filters with corresponding entries in the intermediate sound feature.

As described above, the basis filters (e.g., a basis filter matrix) may be generated by comparing undistorted reference sounds and distorted reference sounds, and used in extracting a noise-robust sound feature from a media sound. In the case of a plurality of basis filters, some basis filters may provide a better result in reducing noise than other basis filters and thus may be selected for use in extracting a sound feature. In the above basis filter matrix, for example, similar sound features may be generated from the first basis filter and the third basis filter based on an undistorted reference sound and a distorted reference sound. On the other hand, less similar sound features may be generated from the second basis filter and the fourth basis filter, as compared to the first and third basis filters, based on the undistorted reference sound and the distorted reference sound. Accordingly, the first basis filter and the third basis filter may be selected (which may also be referred to as "updating" the basis filters) to generate the sound feature C from the media sound, as described below:

$$C = \begin{bmatrix} a_1 & a_2 & \dots & a_n \\ b_1 & b_2 & \dots & b_n \\ c_1 & c_2 & \dots & c_n \\ d_1 & d_2 & \dots & d_n \end{bmatrix} \cdot \begin{bmatrix} f_1 \\ f_2 \\ \vdots \\ f_n \end{bmatrix} \rightarrow C = \begin{bmatrix} a_1 & a_2 & \dots & a_n \\ c_1 & c_2 & \dots & c_n \end{bmatrix} \cdot \begin{bmatrix} f_1 \\ f_2 \\ \vdots \\ f_n \end{bmatrix}$$

Figure 13:
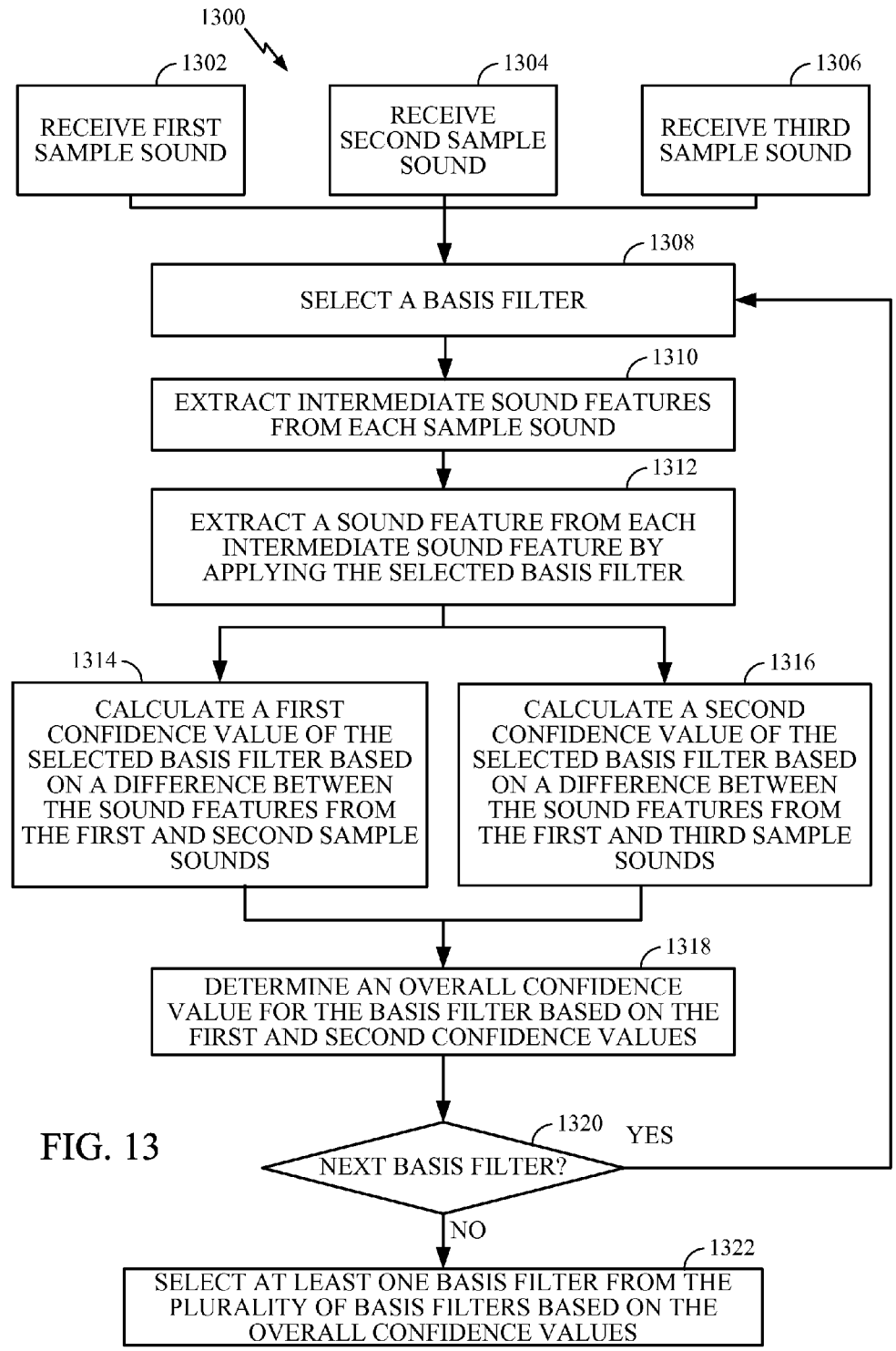
FIG. 13 illustrates a flowchart of a method for selecting at least one basis filter from a plurality of basis filters for use in extracting a sound feature, according to some embodiments.

FIG. 13 illustrates a flowchart of a method 1300 for selecting at least one basis filter from a plurality of basis filters for use in extracting a sound feature, according to some embodiments. The method 1300 for selecting the basis filters may be performed by the basis filter generator 650 in the server 340 of FIG. 6A and FIG. 6B or a basis filter generator in the mobile device 130. Further, the method 1300 for selecting the basis filters can be performed before receiving a media sound in the mobile device 130, and the selected basis filters may be used to extract a sound feature from the media sound after receiving the media sound. The method 1300 is described with reference to a first to third sample sounds for explanation purposes.

In the illustrated method 1300, the basis filter generator 650 receives a first sample sound, a second sample sound, and a third sample sound at 1302, 1304, and 1306, respectively, from the sample sound database 652. The first sample sound is an undistorted sound without noise. The second sample sound is a distorted sound of the first sample sound that adds noise and thus is similar to the first sample sound in sound content. The third sample sound is another undistorted sound without noise and thus is different from the first sample sound in sound content. For example, a sound captured from music played through a speaker (e.g., high fidelity speaker with minimum noise and distortion) may be considered to be similar in content to the same music played through another speaker (e.g., low fidelity speaker). On the other hand, an announcement (e.g., "please turn off your phone") played through a high fidelity speaker may be considered to be dissimilar in content to the music played through the same high fidelity speaker.

After receiving the sample sounds from the sample sound database 652, the basis filter generator 650 initially selects a basis filter from the plurality of basis filters at 1308. From each of the first to third sample sounds, the basis filter generator 650 extracts an intermediate sound feature at 1310 such as power spectrum described above. For each of the intermediate sound features, the basis filter generator 650 applies the selected basis filter to each intermediate sound feature at 1312 to generate a sound feature which is more robust to noise and distortion than the intermediate sound feature.

Once the sound features of the sample sounds have been generated, one or more confidence values, which indicate a degree of similarity between sound features extracted from a pair of sample sounds by applying the selected basis filter, may be calculated by employing any suitable algorithm such as a pairwise boosting (PB) algorithm. When the selected basis filter is applied to intermediate sound features of a pair of sample sounds, the confidence values may also indicate a degree of noise reduction. In one embodiment, the basis filter generator 650 may calculate a confidence value of a difference between the extracted sound features of the similar sample sounds and another confidence value of a difference between the extracted sound features of the dissimilar sample sounds. Specifically, a first confidence value of the basis filter is determined, at 1314, by calculating a difference between the extracted sound features of the first and second sample sounds. For example, given that the first and second sample sounds are similar sounds, if a difference between the sound features extracted by applying the selected basis filter to the intermediate sound features of the first and second sample sounds is low, a confidence value of the basis filter will be high. Further, a second confidence value of the basis filter is determined, at 1316, by calculating a difference between the extracted sound features of the first and third sample sounds. In this case, given that the first and third sample sounds are dissimilar sounds, if a difference between the sound features extracted by applying the selected basis filter to the first and third sample sounds is high, a confidence value of the basis filter will be high.

At 1318, the basis filter generator 650 determines an overall confidence value for the selected basis filter based on the first and second confidence values. In one embodiment, the overall confidence value may be calculated by adding the first and second confidence values. Alternatively, the overall confidence value may be calculated by adding weighted first and second confidence values.

After generating the overall confidence value of the selected basis filter, the basis filter generator 650 determines if there is another basis filter that can be selected at 1320. If so, the method 1300 proceeds back to 1308 to select the next basis filter to determine an overall confidence value. Once overall confidence values have been calculated for all basis filters, the basis filter generator 650 selects at least one basis filter from the plurality of basis filters based on the overall confidence values at 1322. In one embodiment, a basis filter having the highest overall confidence value may be selected.

Alternatively, all basis filters that have an overall confidence value exceeding a predetermined threshold value may be selected.

Figure 14:
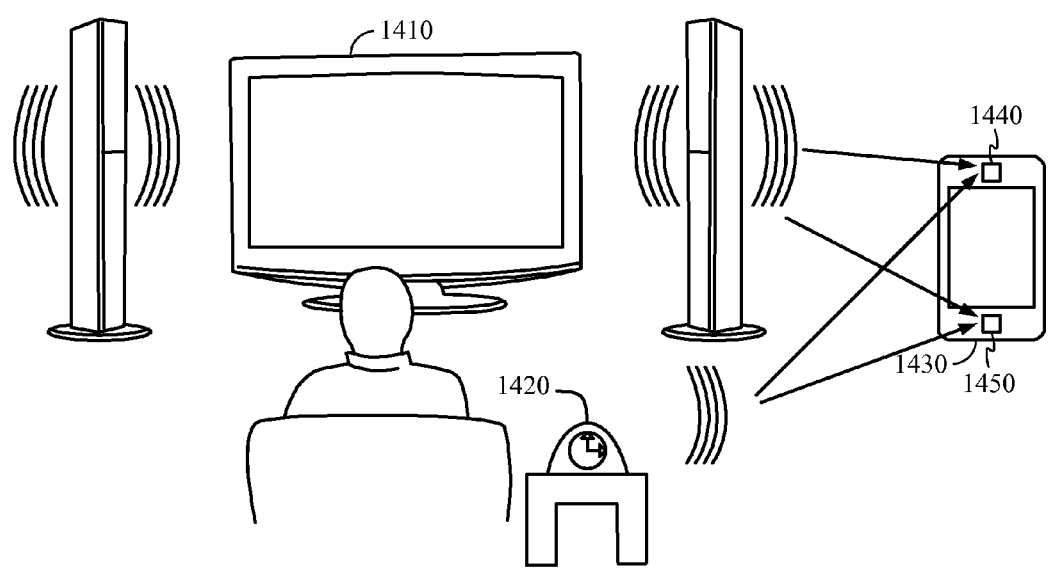
FIG. 14 illustrates a mobile device having a plurality of sound sensors, in which the mobile device is configured to perform at least one function in response to capturing at least one of a plurality of media sounds, according to some embodiments.

FIG. 14 illustrates a mobile device 1430 having a plurality of sound sensors 1440 and 1450, in which the mobile device 1430 is configured to perform at least one function in response to capturing at least one of a plurality of media sounds, according to some embodiments. In the mobile device 1430, the two sound sensors 1440 and 1450 may be, for example, two microphones. Each sound sensor 1440 and 1450 may capture a composite sound including a plurality of sounds (e.g., capture a media sound from a TV 1410 and an alarm sound from a clock 1420 simultaneously) from the surround environment. In one embodiment, the composite sounds captured from each of the sound sensors 1440 and 1450 may be distinguished from each other, for example, due to the sound sensors 1440 and 1450 capturing the sounds in different locations of the mobile device 1430. Based on the different composite sounds received from the sound sensor 1440 and the sound sensor 1450, the mobile device 1430 may separate the composite sound into each of the sounds. In the illustrated embodiment, the mobile device 1430 may capture a composite sound which is mixed with the media sound from the TV 1410 and the alarm sound from the clock 1420. The mobile device 1430 may separate the composite sound into the media sound from the TV 1410 and the sound of the clock 1420, respectively.

After separating the composite sound according to source (e.g., TV or alarm), the mobile device 1430 may extract sound features from each of the separated sounds and determine whether any one of the extracted sound features is associated with a function to be performed on the mobile device 1430. The mobile device 1430 may perform the function associated with the extracted sound feature from one of the separated sounds. It will be appreciated that a plurality of functions may be determined from a plurality of media sounds captured by the sound sensors 1440 and 1450.

Figure 15:
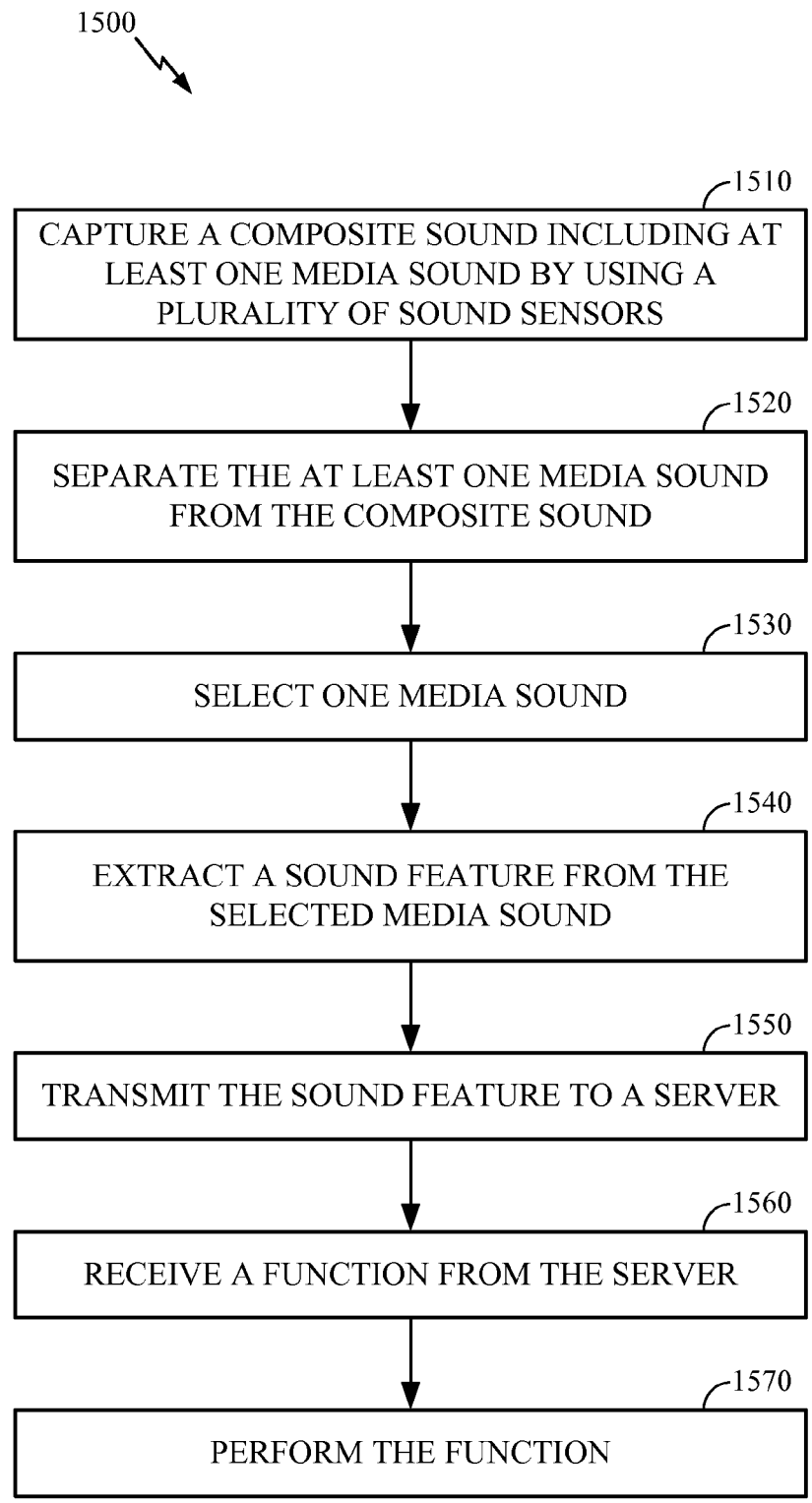
FIG. 15 illustrates a flowchart of a method in a mobile device for performing a function in response to a media sound selected from a plurality of sounds, according to some embodiments.

FIG. 15 illustrates a flowchart of a method 1500 in the mobile device 1430 for performing a function in response to a media sound selected from a plurality of sounds, according to some embodiments. In this method 1500, the mobile device 1430 may capture a sound (i.e., a composite sound) including at least one media sound through sound sensors (e.g., microphones) at 1510. Then, the mobile device 1430 separates the at least one media sound from the captured composite sound at 1520. In this embodiment, the captured sounds may be separated by employing independent component analysis (ICA) or blind source separation (BSS), but is not limited thereto. After separating the sounds, the mobile device 1430 may select one media sound among the plurality of separated sounds at 1530 based on the identification that at least one of the sounds is a media sound or is likely a media sound. In one embodiment, when the mobile device 1430 is located in a movie theater and receives a sound, such as an announcement "Please turn off the phone," from the theater sound system, other sounds (e.g., a ringing sound of a mobile device) may be regarded as noise. In this case, the mobile device 1430 may select the sound from the theater sound system and disregard the other sound from the mobile phone after separating the captured sound. At 1540, the mobile device 1430 extracts a sound feature from the selected media sound. The extracted feature is transmitted to a server at 1550. Based on the sound feature from the mobile device 1430, the server determines a function to be performed in the mobile device 1430, at 1560, and sends information identifying the function to the mobile device 1430. After receiving the information identifying the function from the server, the mobile device 1430 performs the function at 1570.

Figure 16:
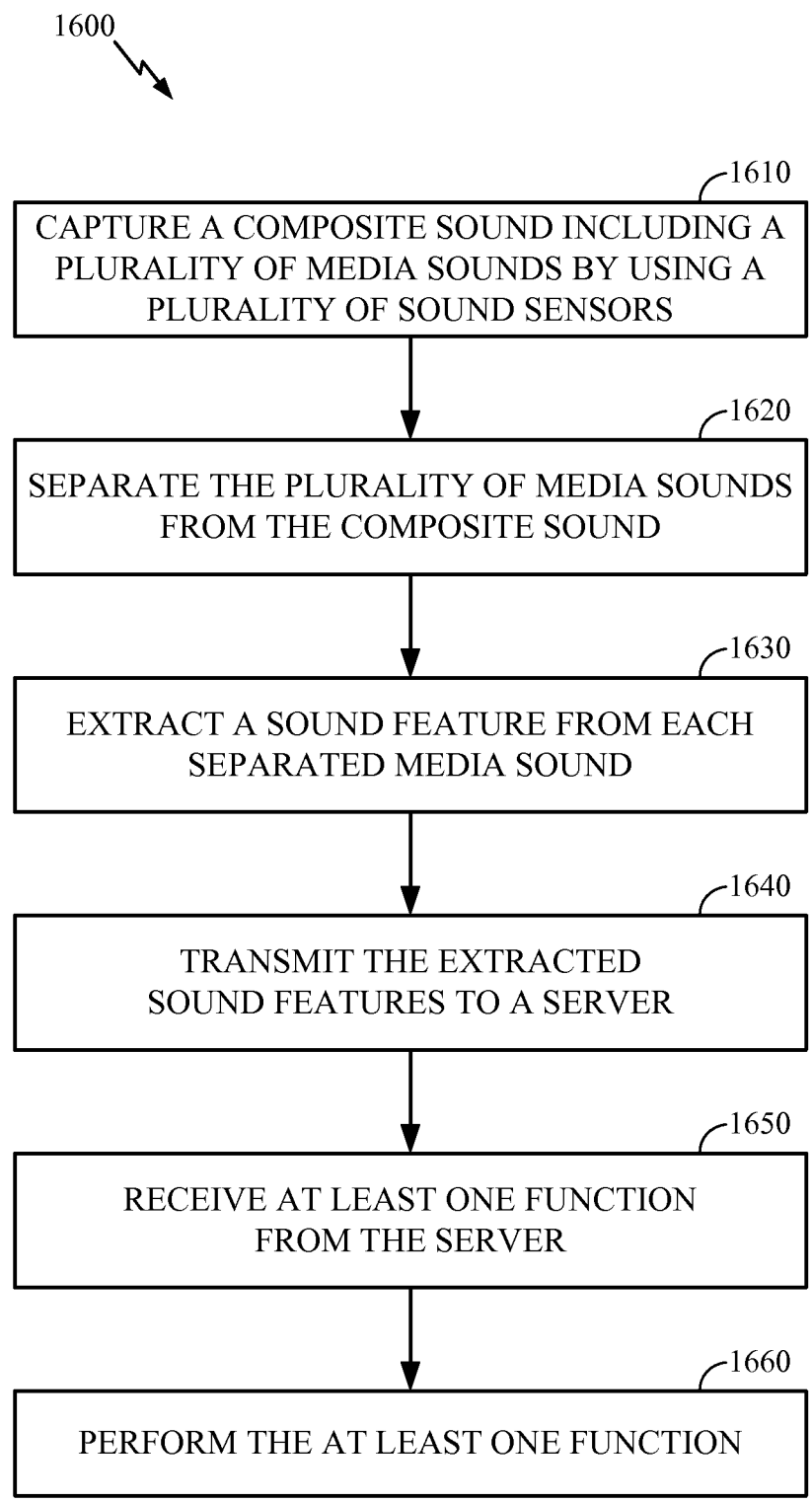
FIG. 16 illustrates a flowchart of a method in a mobile device for performing at least one function in response to a plurality of media sounds, according to some other embodiments.

FIG. 16 illustrates a flowchart of a method 1600 in the mobile device 1430 for performing at least one function in response to a plurality of media sounds, according to some other embodiments. In this method 1600, the mobile device 1430 may capture a composite sound including the plurality of media sounds through sound sensors at 1610. Then, the mobile device 1430 separates the plurality of media sounds from the captured composite sound at 1620. After separating the composite sound, the mobile device 1430 may extract sound features from each of the separated media sounds without selecting any one sound in particular at 1630. The mobile device 1430, at 1640, transmits the extracted sound features to the server. In the movie theater example, the mobile device 1430 may extract a sound feature from a sound of the theater sound system and extract a sound feature from a ringing sound of a mobile device, and send both sound features to the server. Then, the server compares the received sound features with reference sound features stored in a sound feature database, and identifies at least one reference sound feature associated with the extracted sound features. After identifying a match to the reference sound feature, the server may send information identifying at least one function associated with the identified at least one reference sound feature to the mobile device 1430 at 1650. At 1660, the mobile device 1430 performs the at least one function at 1660.

Figure 17:
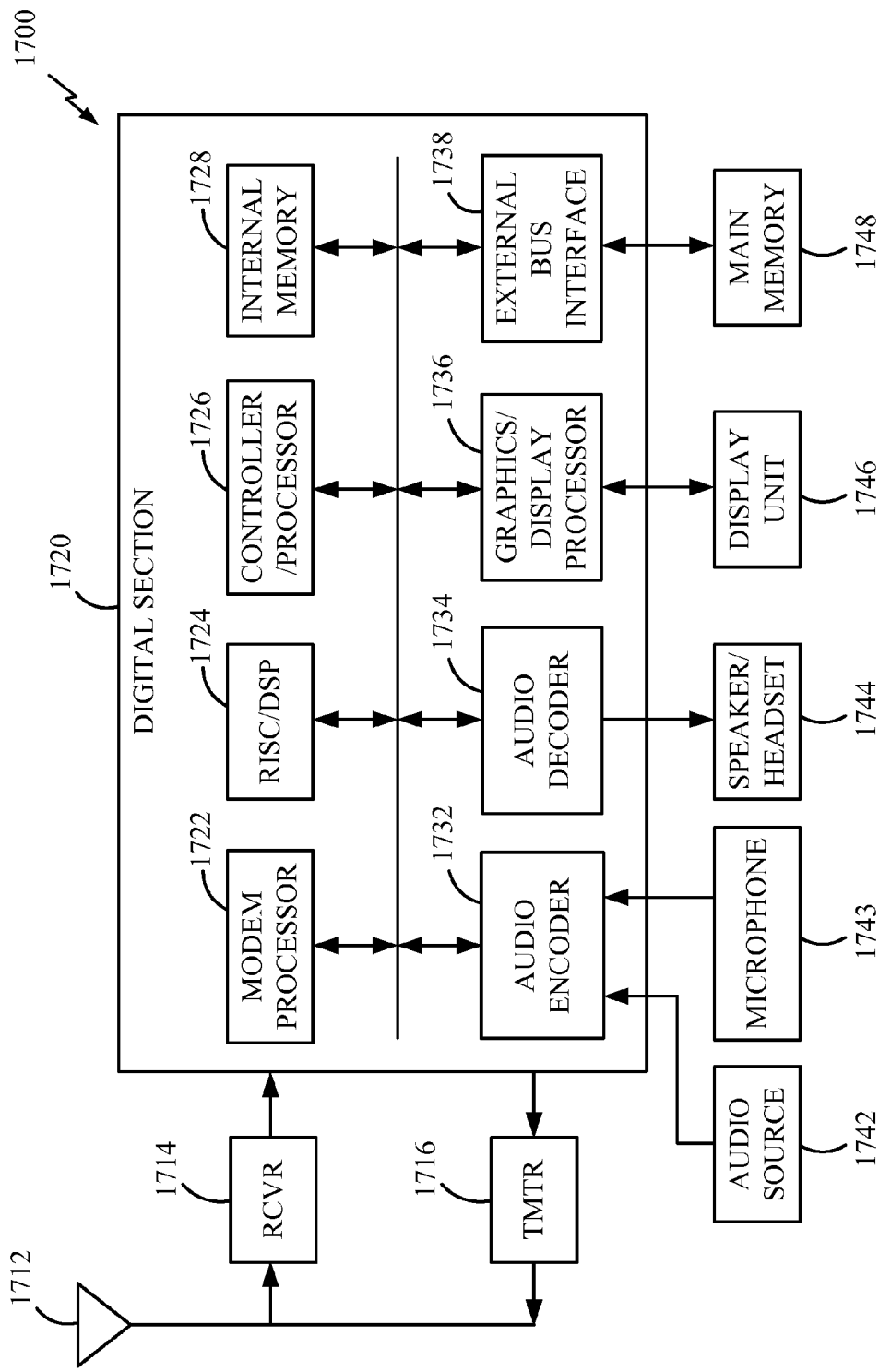
FIG. 17 illustrates a block diagram of an exemplary mobile device in which the methods and apparatus for controlling functions based on sound identification may be implemented according to some embodiments.

FIG. 17 illustrates a block diagram of a mobile device 1700 in a wireless communication system in which the methods and apparatus of the present disclosure for controlling functions based on sound identification may be implemented according to some embodiments. The mobile device 1700 may be a cellular phone, a terminal, a handset, a personal digital assistant (PDA), a wireless modem, a cordless phone, a tablet, and so on. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, and so on.

The mobile device 1700 may be capable of providing bidirectional communication via a receive path and a transmit path. On the receive path, signals transmitted by base stations are received by an antenna 1712 and are provided to a receiver (RCVR) 1714. The receiver 1714 conditions and digitizes the received signal and provides the conditioned and digitized signal to a digital section 1720 for further processing. On the transmit path, a transmitter (TMTR) 1716 receives data to be transmitted from a digital section 1720, processes and conditions the data, and generates a modulated signal, which is transmitted via the antenna 1712 to the base stations. The receiver 1714 and the transmitter 1716 is part of a transceiver that supports CDMA, GSM, W-CDMA, LTE, LTE Advanced, and so on.

The digital section 1720 includes various processing, interface, and memory units such as, for example, a modem processor 1722, a reduced instruction set computer/digital signal processor (RISC/DSP) 1724, a controller/processor 1726, an internal memory 1728, a generalized audio encoder 1732, a generalized audio decoder 1734, a graphics/display processor 1736, and/or an external bus interface (EBI) 1738. The modem processor 1722 performs processing for data transmission and reception, e.g., encoding, modulation, demodulation, and decoding. The RISC/DSP 1724 performs general and specialized processing for the mobile device

1700. The controller/processor 1726 controls the operation of various processing and interface units within the digital section 1720. The internal memory 1728 stores data and/or instructions for various units within the digital section 1720.

The generalized audio encoder 1732 performs encoding for input signals from an audio source 1742, a microphone 1743, and so on. The generalized audio decoder 1734 performs decoding for coded audio data and provides output signals to a speaker/headset 1744. It should be noted that the generalized audio encoder 1732 and the generalized audio decoder 1734 are not necessarily required for interface with the audio source, the microphone 1743 and the speaker/headset 1744, and thus are not shown in the mobile device 1700. The graphics/display processor 1736 performs processing for graphics, videos, images, and texts, which is presented to a display unit 1746. The external bus interface (EBI) 1738 facilitates transfer of data between the digital section 1720 and a main memory 1748.

The digital section 1720 is implemented with one or more processors, DSPs, microprocessors, RISCs, etc. The digital section 1720 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

Figure 18:
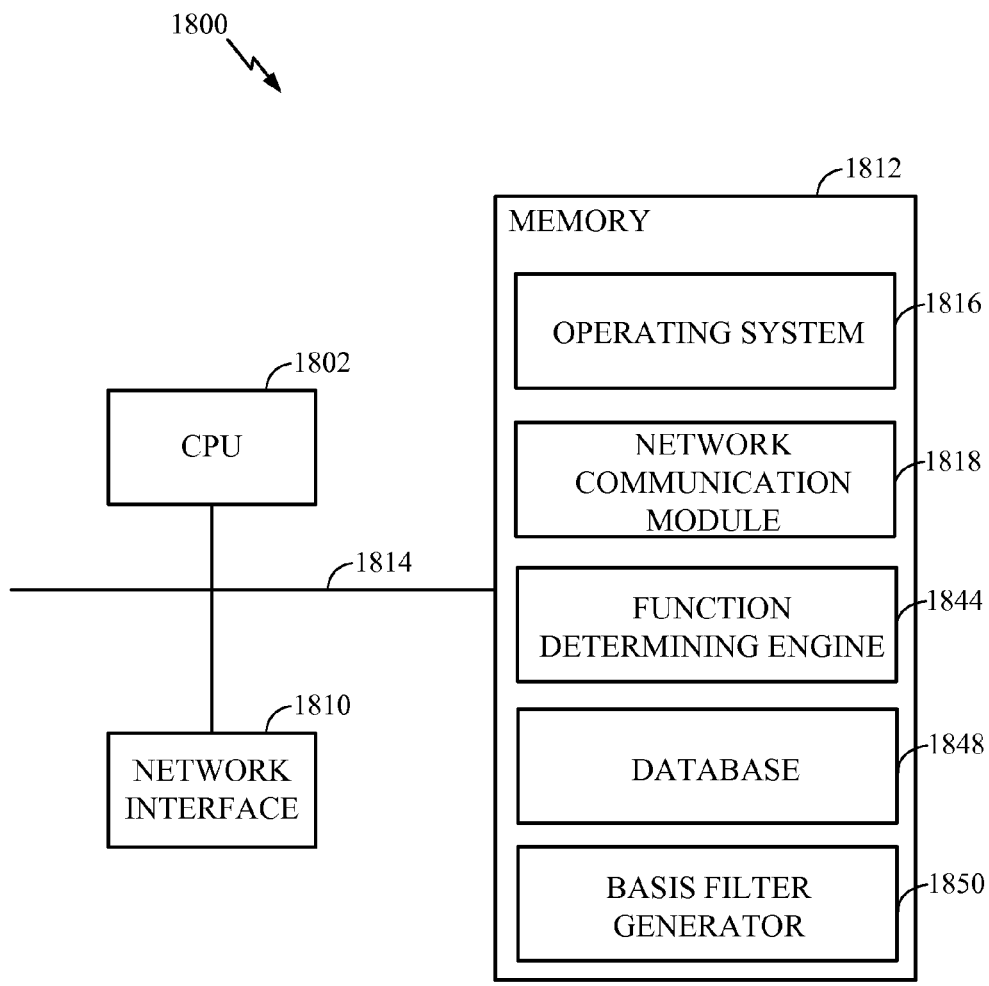
FIG. 18 is a block diagram of a server system in which the methods and apparatus for controlling functions based on sound identification may be implemented according to some embodiments.

FIG. 18 is a block diagram illustrating a server system 1800, which may be any one of the servers previously described, for controlling functions based on sound identification implemented in accordance with some embodiments. The server system 1800 may include one or more processing units (CPU's) 1802, one or more network or other communications interfaces 1810, a memory 1812, and one or more communication buses 1814 for interconnecting these components. The server system 1800 may also include a user interface (not shown) having a display device and a keyboard.

The memory 1812 may be any suitable memory, such as a high-speed random access memory, (e.g., DRAM, SRAM, DDR RAM or other random access solid state memory devices). The memory 1812 may include or may alternatively be non-volatile memory (e.g., one or more magnetic disk storage devices, optical disk storage devices, flash memory devices, or other non-volatile solid state storage devices). In some embodiments, the memory 1812 may include one or more storage devices remotely located from the CPU(s) 1802 and/or remotely located in multiple sites.

Any one of the above memory devices represented by the memory 1812 may store any number of modules or programs that corresponds to a set of instructions for performing and/or executing any of the processes, operations, and methods previously described. For example, the memory 1812 may include an operating system 1816 configured to store instructions that includes procedures for handling various basic system services and for performing hardware dependent tasks. A network communication module 1818 of the memory 1812 may be used for connecting the server system 1800 to other computers via the one or more communication network interfaces 1810 (wired or wireless) and one or more communication networks, such as the Internet, other wide area networks, local area networks, metropolitan area networks, and so on. The memory 1812 may also include a function determining engine 1844 configured to determine a function from a reference sound feature of a media sound with which the function is associated and a basis filter generator 1850 configured to generate and update basis filters for extracting sound features. The function determining engine 1844 and the basis filter generator 1850 may access a database 1848 configured to store reference sound feature data, basis filter data, and/or sample sound data.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1812 may store additional modules and data structures not described above.

FIGS. 17 and 18 are intended more as functional descriptions of the various features of a client system and server system rather than a structural schematic of the embodiments described herein. In practice, and as recognized by those of ordinary skill in the art, items shown separately could be combined and some items could be separated. For example, some items shown separately in FIG. 18 could be implemented on a single server and single items could be implemented by one or more servers. Furthermore, the database 1848 may be implemented on a different set of servers or in other components of the server system 1800. The actual number of servers used to implement the server system 1800, and the allocation of features among them may vary from one implementation to another.

The techniques described herein are implemented by various means. For example, these techniques are implemented in hardware, firmware, software, or a combination thereof. It will be further appreciated that the various illustrative logical blocks, modules, circuits, and algorithm steps described in connection with the disclosure herein may be implemented as electronic hardware, computer software, or combinations of both are possible. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

If implemented in software, the methods, operations, and processes previously described may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable a person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for performing an operation at a mobile device, the method comprising:
    capturing a sound from a sound output device external to the mobile device;
    determining confidence values for a plurality of basis filters;
    selecting at least one basis filter of the plurality of basis filters based on the confidence values;
    processing, based on the at least one basis filter, data representing the sound to extract a sound feature from the data, the sound feature associated with the sound; and
    performing the operation of the mobile device responsive to the sound feature.

2. The method of claim 1, further comprising:
    comparing the sound feature to a plurality of reference sound features, each of the plurality of reference sound features being associated with the operation; and
    identifying a first reference sound feature of the plurality of reference sound features based on the sound feature, the first reference sound feature associated with the operation.

3. The method of claim 1, wherein processing the data representing the sound is performed in response to a determination that a sound level of the sound is greater than a threshold sound level.

4. The method of claim 1, wherein processing the data representing the sound comprises:
    extracting an intermediate sound feature from the data representing the sound, the intermediate sound feature comprising a power spectrum associated with the sound feature; and
    applying the at least one basis filter to the intermediate sound feature to generate the sound feature.

5. The method of claim 1, wherein the at least one basis filter is selected from the plurality of basis filters further based on a plurality of sample sounds extracted from a sample sound database.

6. The method of claim 5, wherein the at least one basis filter is selected to reduce differences between a reference sound of the plurality of sample sounds and a distorted reference sound of the plurality of sample sounds.

7. The method of claim 5, wherein the plurality of sample sounds from the sample sound database includes three samples sounds.

8. The method of claim 5, wherein the confidence values are indicative of an amount of similarity between sound features extracted from a pair of sample sounds of the plurality of sample sounds.

9. The method of claim 1, wherein the sound feature is associated with meta-data including a volume function and context information.

10. The method of claim 1, wherein the sound is captured in a first mode of the mobile device and the data representing the sound is processed in a second mode of the mobile device, wherein the first mode is a lower power mode than the second mode, and wherein the second mode corresponds to a portion of a duty cycle of the mobile device.

11. The method of claim 1, wherein the sound feature corresponds to an announcement associated with a vehicle, and wherein the operation corresponds to providing an output via an interface of the mobile device, the output based on the announcement.

12. The method of claim 1, wherein the sound feature corresponds to a command to reduce a volume of the mobile device, and wherein the operation corresponds to reducing the volume of the mobile device.

13. The method of claim 1, wherein the mobile device comprises a mobile communication device.

14. A method for performing an operation at a mobile device, the method comprising:
    capturing, by a plurality of sound sensors, a composite sound including at least one media sound;
    determining confidence values for a plurality of basis filters;
    selecting at least one basis filter of the plurality of basis filters based on the confidence values;
    processing, based on the at least one basis filter, data representing the composite sound to extract sound data representing the at least one media sound from the data representing the composite sound and to extract at least one sound feature from the sound data representing the at least one media sound; and
    performing the operation of the mobile device responsive to the at least one sound feature.

15. The method of claim 14, further comprising:
    comparing the at least one sound feature to a plurality of reference sound features, each of the plurality of reference sound features associated with the operation; and identifying a first reference sound feature of the plurality of reference sound features based on the at least one sound feature, the first reference sound feature associated with the operation.

16. The method of claim 14, wherein processing the data representing the composite sound includes:
selecting media sound data representing a particular media sound from the sound data representing the at least one media sound; and
extracting a sound feature from the selected media sound data representing the particular media sound.

17. The method of claim 14, wherein extracting the at least one sound feature from the sound data representing the at least one media sound includes extracting sound features from composite sound data representing all media sounds embedded within the composite sound.

18. The method of claim 14, wherein the mobile device comprises a mobile communication device.

19. A mobile device, comprising:
a sound sensor configured to capture a sound from a sound output device external to the mobile device;
a basis filter generator configured to determine confidence values for a plurality of basis filters and to select at least one basis filter of the plurality of basis filters based on the confidence values;
a sound feature extractor configured to process, based on the at least one basis filter, data representing the sound by extracting a sound feature from the data representing the sound after the sound sensor captures the sound; and
a control unit configured to perform an operation of the mobile device responsive to the sound feature.

20. The mobile device of claim 19, further comprising an identifying unit configured to identify a first reference sound feature from a plurality of reference sound features based on the sound feature, the first reference sound feature associated with the operation, wherein the control unit is configured to perform the operation based on the identification of the first reference sound feature.

21. The mobile device of claim 19, wherein the mobile device comprises a mobile communication device.

22. The mobile device of claim 19, further comprising:
an antenna; and
a receiver coupled to the antenna and configured to receive an encoded audio signal from a base station.

23. The mobile device of claim 22, wherein the receiver is configured to digitize the received signal.

24. The mobile device of claim 19, further comprising:
an antenna; and
a transmitter coupled to the antenna and configured to generate a modulated signal associated with the sound and to provide the signal to the antenna.

25. The mobile device of claim 24, further comprising a processor coupled to the transmitter, wherein the processor includes the sound feature extractor.

26. The mobile device of claim 25, wherein the antenna, the transmitter, and the processor are integrated into a mobile communication device.

27. A non-transitory computer-readable storage medium storing instructions for performing an operation at a mobile device, the instructions causing a processor to perform operations comprising:
capturing a sound from a sound output device external to the mobile device;
determining confidence values for a plurality of basis filters;
selecting at least one basis filter of the plurality of basis filters based on the confidence values;
after capturing the sound, processing, based on the at least one basis filter, data representing the sound to extract a sound feature from the data, the sound feature representing the sound; and
performing the operation of the mobile device responsive to the sound feature.

28. The medium of claim 27, wherein the operations further comprise:
comparing the sound feature to a plurality of reference sound features, each of the plurality of reference sound features being associated with the operation; and
identifying a first reference sound feature of the plurality of reference sound features based on the sound feature, the first reference sound feature associated with the operation.

29. The medium of claim 27, wherein processing the data representing the sound is performed in response to a determination that the sound comprises a media sound.

30. The medium of claim 27, wherein processing the data representing the sound comprises:
extracting an intermediate sound feature from the data representing the sound, the intermediate sound feature comprising a power spectrum associated with the sound feature; and
applying the at least one basis filter to the intermediate sound feature to generate the sound feature.

31. The medium of claim 30, wherein the at least one basis filter is selected from the plurality of basis filters further based on a plurality of sample sounds extracted from a sample sound database.

32. The medium of claim 27, wherein the sound feature is associated with meta-data including a volume function and context information.

33. An apparatus comprising:
means for capturing a sound from a sound output device external to a mobile device;
means for determining confidence values for a plurality of basis filters;
means for selecting at least one basis filter of the plurality of basis filters based on the confidence values;
means for processing, based on the at least one basis filter, data representing the sound to extract a sound feature from the data after the means for capturing the sound has captured the sound, the data representing the sound feature; and
means for performing an operation of the mobile device responsive to the sound feature.

34. The apparatus of claim 33, further comprising:
means for identifying a first reference sound feature from a plurality of reference sound features based on the sound feature, the first reference sound feature associated with an operation, wherein the means for performing the operation is configured to perform the operation based on the identification of the first reference sound feature.

35. The apparatus of claim 33, wherein the means for capturing the sound from the sound output device, the means for processing data representing the sound, and the means for performing the operation responsive to the sound feature are integrated into a mobile communicate device.

* * * * *